United States Patent [19]
Kawano et al.

[11] Patent Number: 5,995,623
[45] Date of Patent: Nov. 30, 1999

[54] INFORMATION PROCESSING APPARATUS WITH A SOFTWARE PROTECTING FUNCTION

[75] Inventors: Kenji Kawano; Masahiro Taguchi; Kazuo Saito, all of Nakai-machi, Japan

[73] Assignee: Fuji Xerox Co., Ltd., Tokyo, Japan

[21] Appl. No.: 08/791,486

[22] Filed: Jan. 27, 1997

[30] Foreign Application Priority Data

Jan. 30, 1996 [JP] Japan .................................. 8-013939
Jul. 10, 1996 [JP] Japan .................................. 8-180453

[51] Int. Cl.⁶ .............................. H04L 9/00; H04L 9/16; H04K 1/10
[52] U.S. Cl. .............................. 380/21; 380/28; 380/42; 380/44
[58] Field of Search .................................. 380/21, 4, 28, 380/42, 44, 49, 50

[56] References Cited

U.S. PATENT DOCUMENTS

| | | | |
|---|---|---|---|
| 5,696,823 | 12/1997 | Blaze | 380/21 |
| 5,757,915 | 5/1998 | Aucsmith et al. | 380/25 |
| 5,764,774 | 6/1998 | Liu | 380/49 |
| 5,812,663 | 9/1998 | Akiyama et al. | 380/4 |
| 5,832,083 | 11/1998 | Iwayama et al. | 380/28 |
| 5,835,597 | 11/1998 | Coppersmith et al. | 380/28 |
| 5,835,601 | 11/1998 | Shimbo et al. | 380/49 |
| 5,860,099 | 1/1999 | Milios et al. | 711/103 |

FOREIGN PATENT DOCUMENTS

| | | | |
|---|---|---|---|
| 63-124153 | 5/1988 | Japan | G06F 12/14 |
| 63-184853 | 7/1988 | Japan . | |
| 2-155034 | 6/1990 | Japan . | |
| 4-101529 | 4/1992 | Japan . | |
| 4-229346 | 8/1992 | Japan . | |

Primary Examiner—Tod R. Swann
Assistant Examiner—Justin T. Darrow
Attorney, Agent, or Firm—Oliff & Berridge, PLC

[57] ABSTRACT

The present invention provides an information processing apparatus which comprises separating means for separating inputted data into identification data and data to be encrypted, determination means for determining an encryption method specified by a combination of an encryption key and an encryption algorithm in accordance with the identification data separated by the separating means, encryption means for encrypting the data to be encrypted by utilizing the encryption method determined by the determination means and generating encrypted data having the number of bits same as that of the data to be encrypted, and locating means for locating the identification data showing the encryption method used for encrypting the data to be encrypted in a predetermined position in the encrypted data.

28 Claims, 23 Drawing Sheets

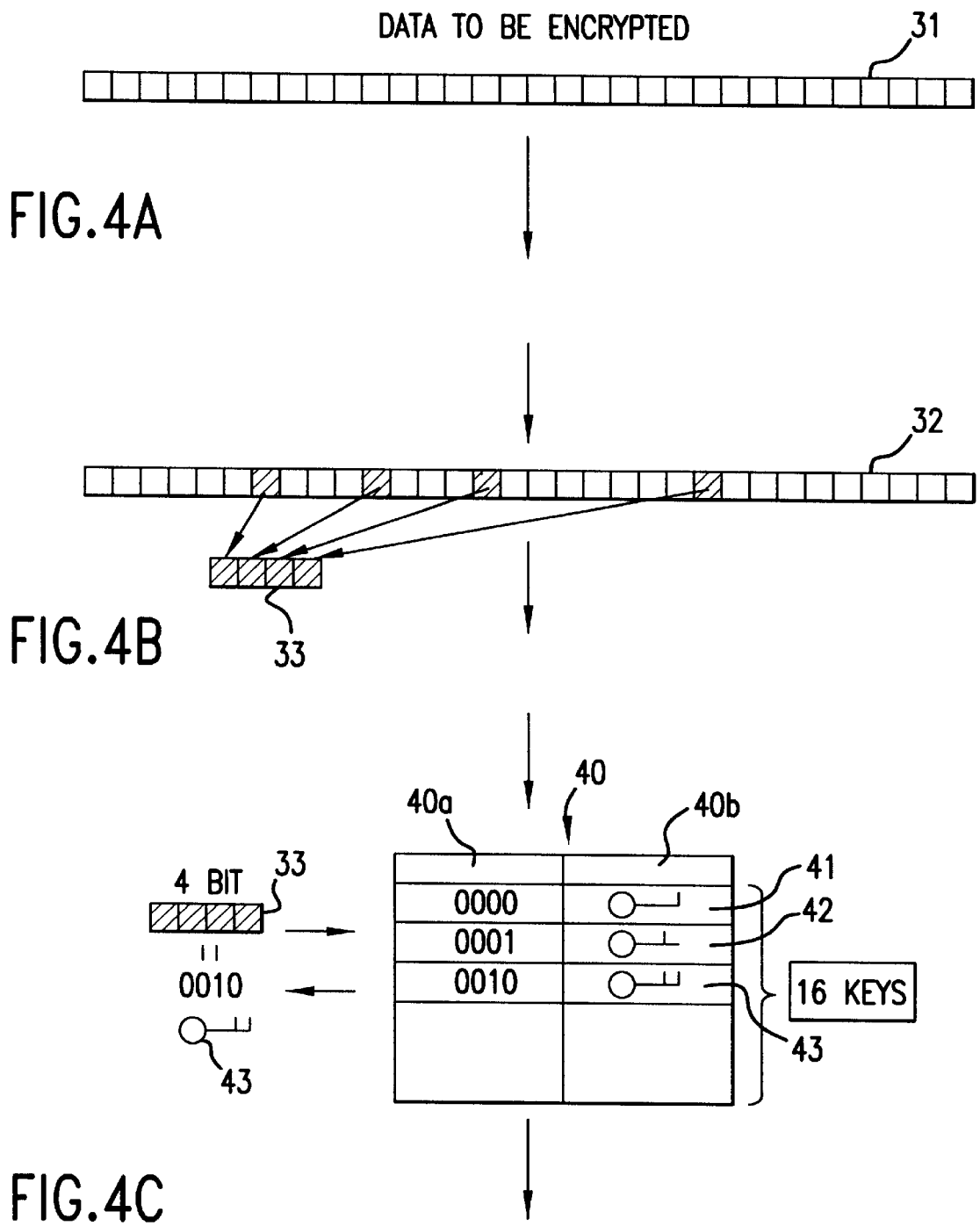

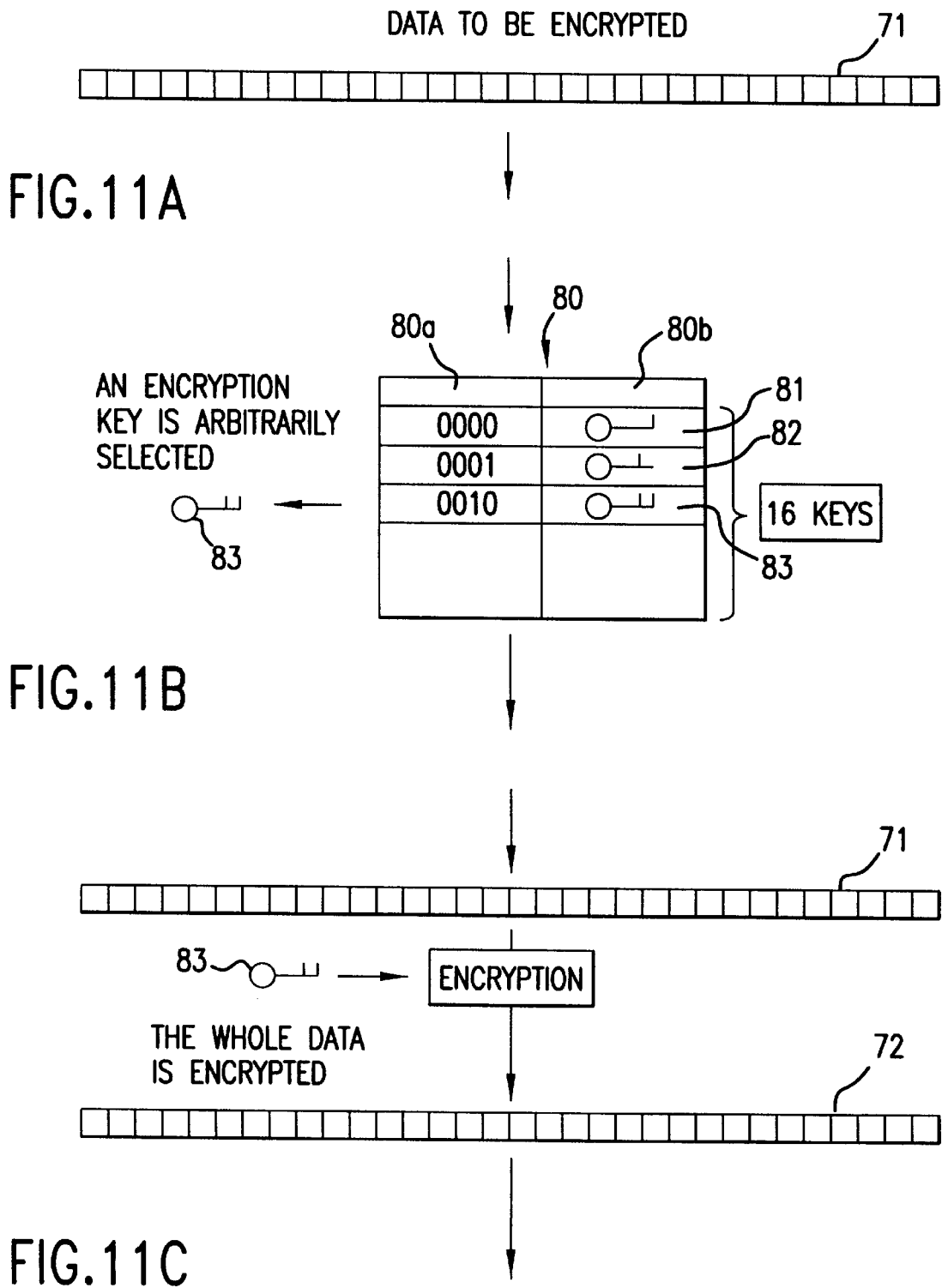

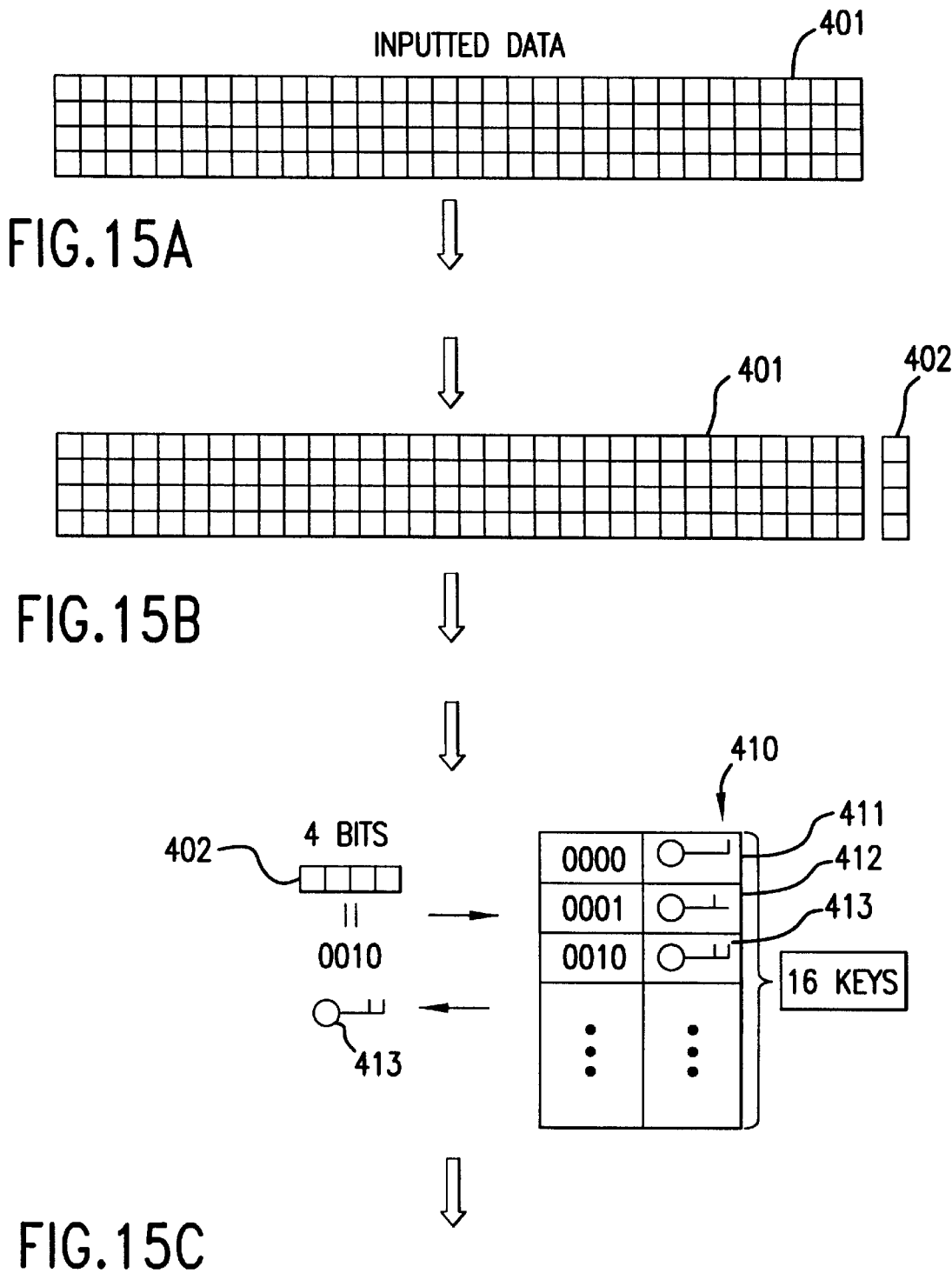

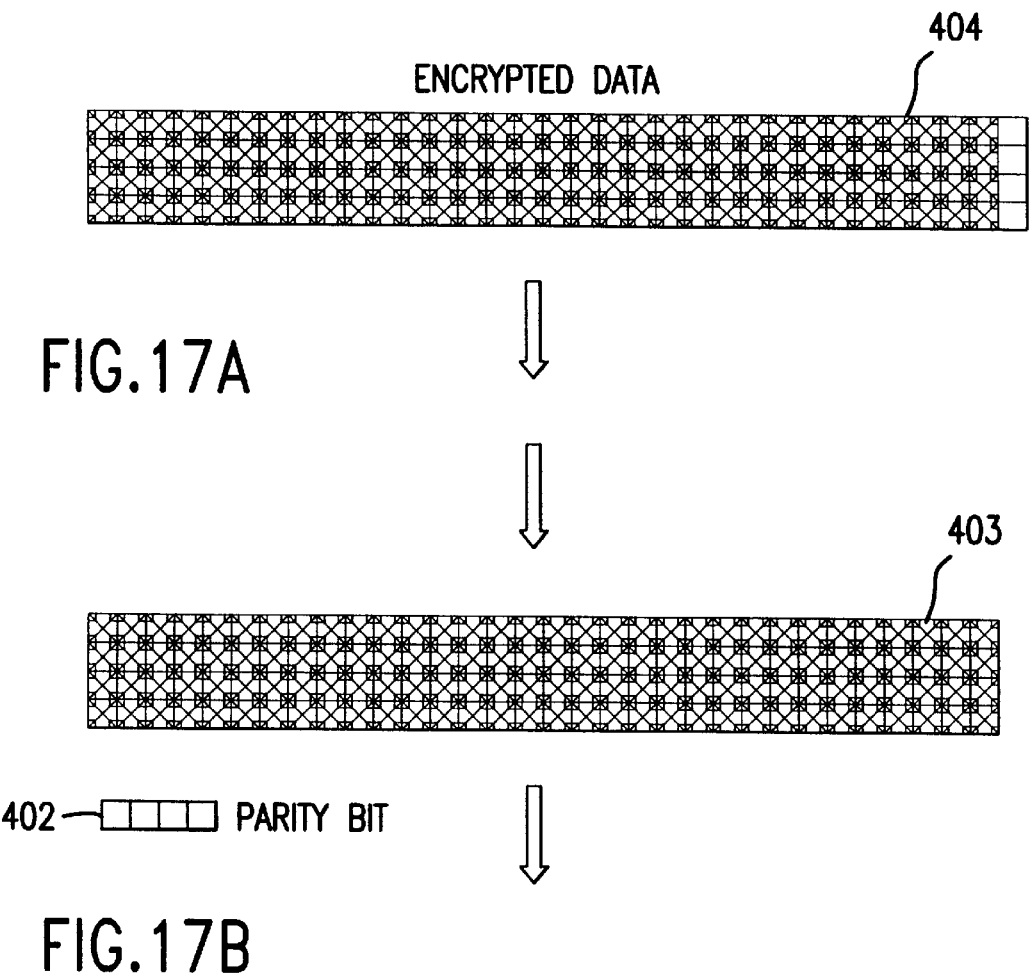
FIG.17A
FIG.17B
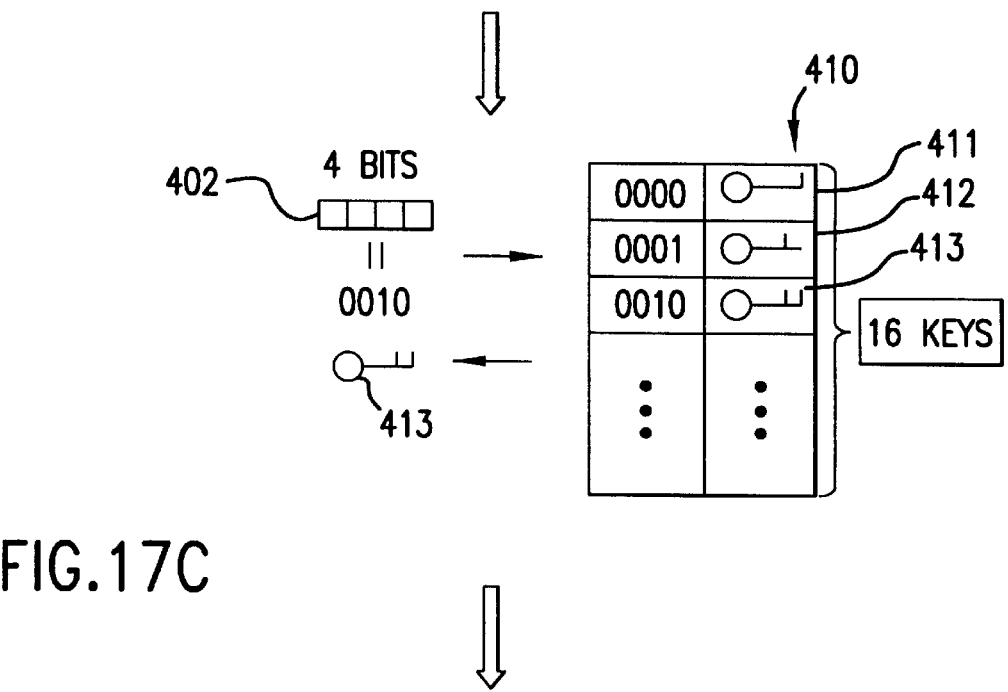
FIG.17C

INFORMATION PROCESSING APPARATUS WITH A SOFTWARE PROTECTING FUNCTION

BACKGROUND OF THE INVENTION

1. Field of the Invention

The present invention relates to an information processing apparatus with a software protecting function and in particular relates to an information processing apparatus having an encryption unit which encrypts processed data or a decryption unit which decrypts the encrypted data to be processed, or both.

2. Discussion of the Related Art

In the case where created programs or data are distributed (hereinafter, programs and data are simply and inclusively referred to as "data" unless otherwise noted), it is necessary to protect the data from being stolen, tampered with or used in unauthorized manner. As the protection means, so far, methods, such as storing the data in a ROM, floppy disk, or the like to render them copy-protected, have been employed. However, these methods allow the contents of the data being read without difficulty; therefore the data cannot be protected perfectly.

In another way, it is possible to enable only the user who has a decryption key to decrypt and use data upon decrypting the data and distributing them. However, according to this method, the decrypted programs or data are unprotected, which results in a security hole and may allow theft, tampering or unauthorized use of the data.

As a technique for resolving the above-described problems, a Japanese Patent Laid-Open Publication No. Hei. 2-155034 (1990) has disclosed an information processing apparatus in which the data is encrypted and stored in a memory or the like and then decrypted when executed in a CPU so that decrypted programs or data may not be accessed in unauthorized manner. According to the method, the encryption unit and the decryption unit are disposed inside of the information processing apparatus for protecting the data, and thereby software is protected. The information processing apparatus is now described more specifically below.

FIG. 18 is a block diagram showing a conventional information processing apparatus designed to protect the software. The information processing apparatus shown in FIG. 18 has a CPU 510, a storage device 523, an input device 521, an output device 522 and a key input device 524. The CPU 510 further comprises an arithmetic unit 511, a control unit 512, an encryption/decryption unit 513 and a key storage unit 514.

The CPU 510 functions as the center of the information processing apparatus and performs data operation, control of other units, and so forth. The storing unit 523 stores data, and transmits/receives data to/from the encryption/decryption unit 513 in the CPU 510 under the control of the CPU 510.

The input device 521 receives data from the outside of the information processing apparatus under the control of the CPU 510. The output device 522 outputs the data processed by the information processing apparatus to the outside under the control of the CPU 510. The key input device 524 sets a group of keys necessary to perform encryption or decryption in the CPU 510.

The arithmetic unit 511 in the CPU 510 performs arithmetic operation or logical operation on the data given by the input device 521 or storage device 523. The control unit 512 interprets instructions provided by the storing device 523 to control all over the information processing apparatus. The key storing unit 514 stores the keys set by the key input device 524. The encryption/decryption unit 513 is located between the storing device 523 and the arithmetic unit 511, which decrypts the instructions and data having been encrypted by utilizing a key in the key storage unit 514 so that the arithmetic unit 511 may interpret them, and also encrypts the result of operation performed in the arithmetic unit 511 by utilizing the key in the key storing unit 514 and then stores it in the storage device 523.

With the above-described construction, the data to be stored in the storage device 523 can be constantly kept encrypted. Accordingly, if the data in the storing unit 523 is stolen, it is difficult to analyze its content, and thereby the secrecy of the data can be improved.

In such information processing apparatus with a software protecting function, the programs or data which have been encrypted and stored should be decrypted one after another when they are executed. Therefore, overhead in decryption process must be taken into consideration, and thereby an encryption method adopting a relatively simple algorithm with a small computation amount, XOR for example, should be used. As a result, a problem occurs that the encryption security is deteriorated. Accordingly, it is necessary to raise the level of the encryption security as high as possible even though the encryption method adopting a relatively simple algorithm is used.

For raising the encryption security level, efforts have been made in changing the encryption method to be rendered secret. However, if such method is employed, another problem occurs that interchangeability between data is greatly lost, and besides, in each apparatus, it does not necessarily follow that the encryption security is increased because the encryption algorithm or encryption key may be analogized based on the frequency of a specific instruction code appearing in the program or correspondence between the encrypted program and operation of the apparatus.

As described above, sufficient encryption security level cannot be obtained by simply rendering the encryption method secret, and therefore some other methods for obtaining high encryption security level with a small computation amount have been considered, which are described as follows.

A first example is a method of changing the encryption algorithm per every memory address (area), which is disclosed by a Japanese Patent Laid-Open Publication No. Sho. 63-184853 (1988), as "portable electronic device". For the device, a data memory unit divided into plural areas, a control unit for reading/writing data from/to the data memory unit are provided, wherein one of different encryption algorithms is assigned to each area of the data memory unit. Accordingly, the encryption algorithm or encryption key can be changed per every address or area, and thereby the secrecy of the data is increased.

A second example is a method of encrypting a piece of data on an address in a memory and all other data by the piece of data itself, which is disclosed by Japanese Patent Laid-Open Publication No. Hei. 4-229346 (1992), as "encryption of addressed information stream to be used for program code protection". The object of the method is to test or transfer the protected programs or data stored in the Erasable and Programmable Read Only Memory (EPROM) without disclosure. According to the method, it is unnecessary to especially provide a key byte for storing an encryption key because the encryption key is a piece of data stored in the memory; therefore the silicon area of the EPROM is not wasted. Moreover, since the data region used as the encryption key is also encrypted by itself; therefore, if the exclusive NOR gate is used as the encryption method, for example, the data region used as the encryption key may be the output byte of the logical value FFh, whereby the encryption key can be kept secret.

A third example is the method of raising the level of the encryption security by utilizing the Cipher Block Chaining (CBC) or the Cipher Feed Back (CFB), which is the operation mode of the Data Encryption Standard (DES: an encryption algorithm disclosed by the Standards Bureau, U.S. Department of Commerce, currently the American National Standards Institute on 1977) instead of plural encryption keys. The CBC and CFB modify the input of the next encryption step by using the output of the preceding encryption step.

In the DES, the data to be encrypted is divided into data blocks of 64 bits, and then the blocks are processed one by one. The CBC uses not only the data and decryption key of every block, but also a value obtained by encryption of the preceding block. The CFB encrypts the first block and uses the encrypted data obtained thereby as the input to the DES to generate a pseudo random output. The output is further concatenated to the data of the next block for generating a cipher text. The cipher texts are sequentially concatenated by repeating the process. According to the method of CBC or CFB, the encrypted blocks are influenced with each other; and therefore, it is possible to relate not only an encrypted block to an immediately preceding encrypted block, but also each of all other encrypted blocks to another one. Consequently, the blocks cannot be decrypted in an order other than the predetermined one.

As a fourth example, "an encryption-communication method" is disclosed by Japanese Patent Laid-Open Publication No. Hei. 4-101529 (1992), wherein an encrypted electronic filing document in which an encryption key is embedded is transmitted, and the encryption key is extracted from the received encrypted electronic filing document, and then the encrypted electronic document is decoded and interpreted by using the extracted encryption key. In the encryption-communication method, the encryption key is directly embedded in the encrypted electronic document and the position where the key is embedded is determined by a random number value provided by the number of times of communication with the receiver. Each of the transmitter and the receiver has a counter of the number of communication times and random number generation means for generating a random number corresponding to the value of the counter. With this construction, it is possible to change the encryption key in every communication and thereby make it difficult for any third person to tap the key.

However, each of the above-described methods designed for raising the level of the encryption security with a small computation amount has the problems as follows.

The method shown as the first example which changes the encryption algorithm or encryption key corresponding to the address or area has a good effect on a memory in which the relation between the data and data address is not changed, such as a ROM. However, currently the computer having a virtual memory is the mainstream, and the method cannot be applied thereto.

That is, in the computer having the virtual memory, the storage unit used by a processor has a hierarchical structure comprising a main memory and a secondary memory. In this case, the address of the encrypted data on the main memory is frequently changed whenever the encrypted data is swapped in the main memory from the secondary memory, or is swapped out of the main memory to the secondary memory. As a result, a problem occurs that the encrypted data on the data address does not match with the encryption algorithm or encryption key.

In the method shown as the second example, the region to be encrypted is determined by the address; therefore, as same as the method of the first example, it cannot be applied to the computer having a memory with the hierarchical structure.

The method shown in the third example uses only a single encryption key in practice, which causes a problem that if the encryption key is found, all other data are readily analyzed and interpreted.

The method shown in the fourth example is the encryption method applied to the communication, wherein the encryption key itself is embedded in the encrypted electronic document so that the transmitter and the receiver may not need to share the encryption key. Consequently, if the position where the encryption key is embedded is known to the person with the intent to commit tapping, the encryption key itself is found by him. To avoid this problem, the fourth example changes the position where the encryption key is embedded in accordance with the random number value determined based on the number of times of communication. Therefore, the transmitter and the receiver are required to operate synchronously for accurate communication of the data therebetween, that is, the order of encryption and decryption must be the same. However, in a memory of an information processing apparatus on the basis of random access, it is impossible in practice to adopt the method. I In many cases, the unit of data processed by the information processing apparatus may be the same number of bits (for example, 32 bits or 64 bits) for improving the processing efficiency. Therefore, the data having the number of bits of the encryption key is added, the difference occurs in the data size between the data before encryption and the encrypted data. Software should be designed on the premise that the encryption causes difference in the data size, which results in a great loss of versatility of the software; and besides, information about the partial encryption method must be published to a software developer, and accordingly the encryption security is extremely deteriorated.

To maintain the versatility of the software, the change of the data size should be made up for by the hardware; therefore drastic design change of architecture of the information processing apparatus is required.

In addition, the unit of data to be processed by the information processing apparatus is generally shorter than that used in communication; therefore the ratio of the size of the encryption key data to the size of whole data to be encrypted becomes too large. As a result, a problem occurs that the memory space of the storage device cannot be effectively used. If the size of the encryption key data is reduced to prevent waste of the space in the memory, the encryption security level is lowered.

As means for resolving the problem in the method shown in the first example, it is possible to have the encryption algorithm or encryption key match with the encrypted data on the address by making the address or area correspond to the virtual memory space, on condition that such virtual address must be administrated by an operating system (hereinafter referred to as OS). In general, the OS is provided as the software, and consequently, OS is easily tampered with by concentratively cryptanalizing a part of the OS where control of switching of the encryption algorithm or encryption key is performed, especially in the case of such system with relatively low level of encryption security. As a result, tampering such as to directly output the data once decrypted in the apparatus to the outside is possible, which causes a problem that all data are analyzed and interpreted by tampering with only a part of the OS.

As described so far, conventionally it has been difficult to obtain high level of encryption security with a small computation amount independent of the memory administration method of a computer. The encryption method using plural keys or encryption algorithms makes it possible to obtain the high level of encryption security with a small computation amount, on condition that, even in this case, there is no complex key administration carried out by the OS.

SUMMARY OF THE INVENTION

The present invention has been made in view of the above circumstances and has an object to provide an information processing apparatus having an encryption unit which is able to obtain encrypted data of high encryption security level by an encryption algorithm with a small computation amount and simple key administration independent of a memory administration method of a computer.

Another object of the present invention is to provide an information processing apparatus having a decryption unit which can decrypt encrypted data of high encryption security level by a decryption algorithm with a small computation amount and simple key administration independent of a memory administration method of a computer.

The other object of the present invention is to provide an information processing apparatus having an encryption/decryption unit which is able to obtain encrypted data of high encryption security level and to decrypt encrypted data by an encryption/decryption algorithm with a small computation amount and simple key administration independent of a memory administration method of a computer.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a first aspect of an information processing apparatus of the present invention comprises separating means for separating inputted data into identification data and data to be encrypted, determination means for determining an encryption method specified by a combination of an encryption key and an encryption algorithm in accordance with the identification data separated by the separating means, encryption means for encrypting the data to be encrypted by utilizing the encryption method determined by the determination means and generating encrypted data having the number of bits same as that of the data to be encrypted, and locating means for locating the identification data showing the encryption method used for encrypting the data to be encrypted in a predetermined position in the encrypted data.

With this construction, the encrypted data is separated into the identification data and the data to be encrypted, and it is possible to specify a decryption method for decrypting the encrypted data in accordance with the separated identification data; therefore, the decryption method for decrypting the encrypted data can be specified independent of the memory administration method of the computer. Accordingly, it is possible to encrypt the data to be processed by the information processing apparatus by utilizing plural encryption methods, and thereby the encrypted data of high encryption security level can be obtained even in the case of utilizing an encryption algorithm with a small computation amount. Moreover, because a part of the inputted data is used as the identification data, it is unnecessary to add extra information for specifying the decryption method. Furthermore, by utilizing the identification data instead of the encryption key itself, the restriction on the bit length of the encryption key is removed and the use of plural encryption algorithms is permitted.

For a second aspect of the information processing apparatus of the present invention, encryption method determination means for determining an encryption method specified by a combination of an encryption key and an encryption algorithm, encryption means for encrypting data to be encrypted by utilizing the encryption method determined by the encryption method determination means and generating encrypted data, first computation means for inputting the encrypted data encrypted by the encryption means into a specific function and computing a value of the function, decryption method storing means for storing a decryption method specified by a combination of a decryption key and a decryption algorithm in correspondence with the function value computed by the first computation means, storing means for storing the encrypted data encrypted by the encryption means, second computation means for inputting the encrypted data stored in the storing means into a specific function and computing a value of the function, decryption method determination means for selecting a decryption method corresponding to the function value computed by the second computation means from the decryption method storing means, decryption means for decrypting the encrypted data by utilizing the decryption method determined by the decryption method determination means, and information processing means for processing the data decrypted by the decryption means are provided.

With this information processing apparatus, the decryption method for decrypting the encrypted data can be specified by the function value of the encrypted data, and thereby the decryption method for decrypting the encrypted data can be specified independent of the memory administration method of a computer. Accordingly, it is possible to encrypt the data to be processed by the information processing apparatus by utilizing plural encryption methods, and as a result, encrypted data of high encryption security level is obtained even though the encryption algorithm of a small computation amount is used.

For a third aspect of the information processing apparatus according to the present invention, determination means for determining an encryption method specified by a combination of an encryption key and an encryption algorithm, encryption means for encrypting data to be encrypted by utilizing the encryption method determined by the determination means and generating encrypted data, and location means for locating identification data which show the encryption method utilized for encryption of the encrypted data in a predetermined position in the encrypted data are provided, In the third aspect of the information processing apparatus, as described above, the data size is increased by encryption; accordingly update of a part of the software or design change of the architecture is required. However, since the identification data, not the encryption key itself, is added, the bit length of the encryption key itself can be kept secret though the bit length of the identification data is published to the software designer, whereby deterioration of the encryption security can be prevented. Consequently, according to this information processing apparatus, the decryption method for decrypting the encrypted data can be specified by the encrypted data itself, that is, the decryption method for decrypting the encrypted data can be specified independent of the memory administration method of the computer. As a result, it becomes possible to encrypt the data to be processed by the information processing apparatus by utilizing plural encryption methods, and thereby the encrypted data of high encryption security level can be obtained even if an encryption algorithm with a small computation amount is used. The use of the identification data, instead of the encryption key itself, enables to remove restriction on the bit length of the encryption key and to use the plural encryption algorithms.

For a fourth aspect of the information processing apparatus of the present invention, encryption method determination means for determining an encryption method specified by a combination of an encryption key and an encryption algorithm in accordance with a value of a parity bit of inputted data to be encrypted, encryption means for encrypting the data to be encrypted by utilizing the encryption method determined by the encryption method determination means, decryption method determination means for determining a decryption method specified by a combination of a decryption key and a decryption algorithm in accordance with a value of the parity bit of data to be decrypted, and decryption means for decrypting the data to be decrypted by utilizing the decryption method determined by the decryption method determination means are provided.

According to the fourth aspect of the information processing apparatus of the present invention, the encryption method and the decryption method can be determined in accordance with the value of the parity bit, and therefore it is completely unnecessary to carry out administration per every area or every address in the memory. Moreover, by utilizing a versatile parity check mechanism for determination of the encryption method or the decryption method, it becomes possible to greatly reduce mechanisms required for administrating plural encryption methods or decryption methods.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIGS. 4(A) through 4(E) show the state transition of data in steps 1 through 5 in FIG. 3, respectively;

FIGS. 11(A) through 11(E) show the state transition of data in steps 31 through 35 in FIG. 10, respectively;

FIGS. 15(A) through 15(E) show the state transition of data in steps 41 through 45 in FIG. 14, respectively;

FIGS. 17(A) through 17(D) show the state transition of data in steps 51 through 54 in FIG. 16, respectively.

DETAILED DESCRIPTION OF THE PREFERRED EMBODIMENTS

Preferred embodiments of an information processing apparatus according to the present invention are now described in detail based on the drawings.

First Embodiment

Figure 1:
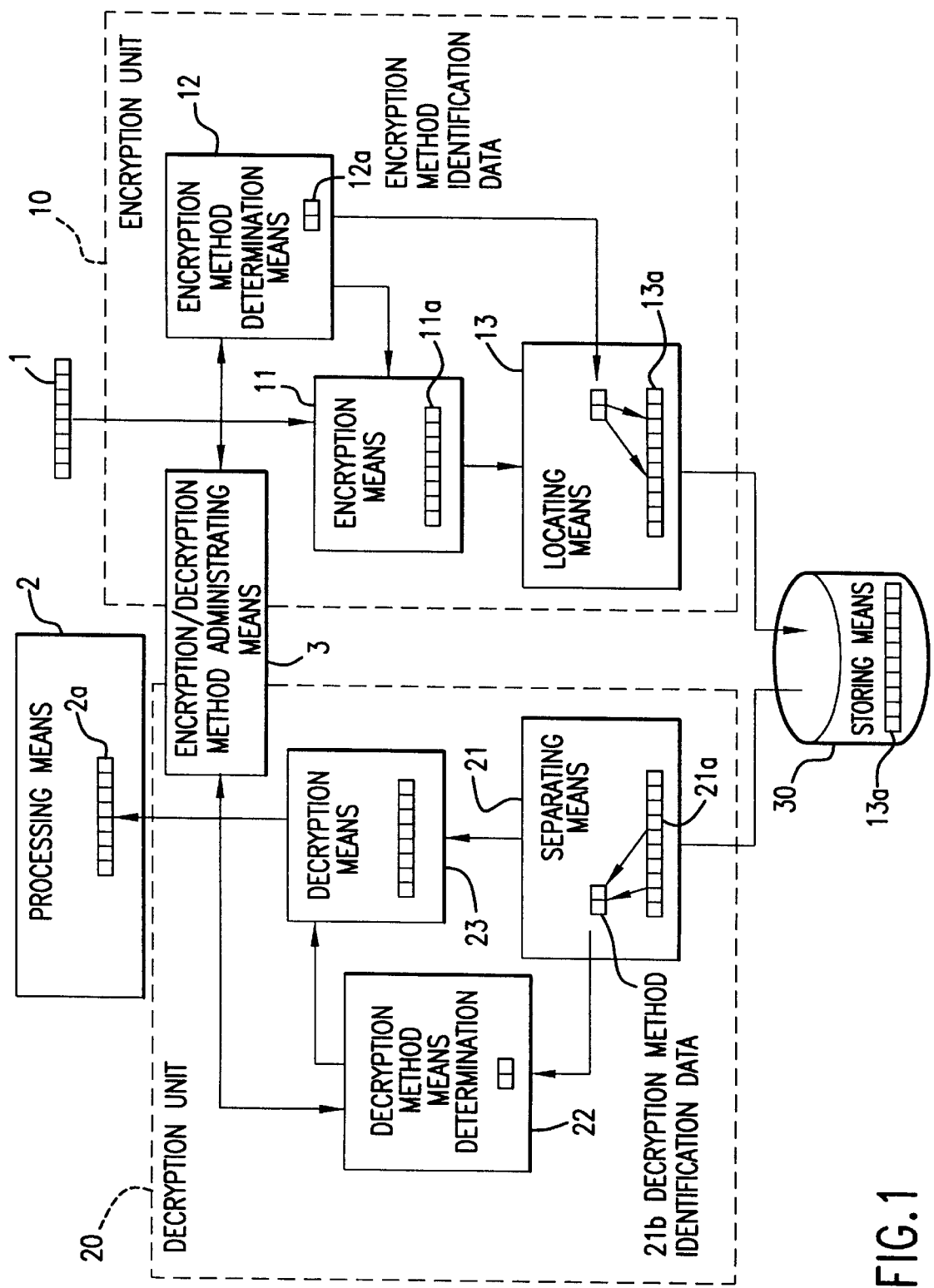
FIG. 1 shows principles of an encryption/decryption unit according to the present invention.

FIG. 1 shows principles of an embodiment of an information processing apparatus according to the present invention. The information processing apparatus comprises an encryption unit 10 for encrypting inputted data 1 to be encrypted, a decryption unit 20 for decrypting and outputting the data to be processed, storing means 30 for storing encrypted data 13a encrypted in the encryption unit 10, processing means 2 for processing data decrypted by decrypting means 23 in accordance with an instruction contained in the decrypted data, and encryption/decryption method administrating means 3 for connecting an encryption method determined by encryption method determination means 12 and a decryption method determined by decryption method determination means 22.

For the encryption unit 10, encryption method determination means 12 for determining the encryption method specified by a combination of an encryption key and an encryption algorithm, encryption means 11 for encrypting the data 1 to be encrypted by utilizing the encryption method determined by the encryption method determination means 12 for generating encrypted data 11a, and locating means for locating encryption method identification data 12a which indicates the encryption method used for encryption of the encrypted data 11a to a predetermined position in the encrypted data are provided.

For the decryption unit 20, separating means 21 for separating the encrypted data 13a stored in the storing means 30 into data to be decrypted 21a and decryption method identification data 21b, decryption method determination means 22 for determining a decryption method specified by a combination of a decryption key and a decryption algorithm in accordance with the decryption method identification data 21b separated by the separating means 21, and decryption means 23 for decrypting data 21a to be decrypted by utilizing the decryption method determined by the decryption method determination means 22 are provided.

With the information processing apparatus, when the data 1 to be encrypted is inputted to the encryption unit 10, the encryption method determination means 12 identifies the encryption method identification data 12a, and the encryption key and encryption algorithm according to the encryption method identification data 12a are provided to the encryption method determination means 12 from the encryption/decryption method administration means 3. The data 1 to be encrypted is encrypted by the encryption means 11 utilizing the encryption method determined by the encryption method determination means 12 to generate the encrypted data 11a. Then the encryption method identification data 12a is located in the encryption data 11a by the locating means 13 and thereby the encrypted data 13a is generated. The encryption data 13a is stored in the storing means 30, and thus the encryption process is completed.

If the request for processing the encrypted data 13a is made, the separating means 21 in the decryption unit 20 separates the encrypted data 13a stored in the storing means 30 into the data 21a to be decrypted and the decryption method identification data 21b. Then the decryption key and the decryption algorithm are provided in accordance with the decryption method identification data 21b to the decryption method determination means 22 by the encryption/decryption method administration means 3. The decryption method determination means 22 determines a decryption method provided by the encryption/decryption method administration means 3 as the decryption method for decrypting the data 21a to be decrypted. The data 21a to be decrypted is decrypted by the decryption means 23 with the decryption method determined by the decryption method determination means 22. The decrypted data 2a has the same contents as those of the data 1 to be encrypted. The processing means 2 executes processes according to the instruction contained in the decrypted data 2a.

Thus the encryption method can be determined arbitrarily; therefore it is possible to prepare plural combinations of the encryption algorithm and the encryption data for providing a different encryption method to each data to be encrypted. This enables the encryption algorithm with a small computation amount to provide the encrypted data of high encryption security level. Moreover, by having the encrypted data contain the identification data, the decryption method can be specified independent of the memory administration method of the computer when the decryption is performed. The relation of correspondence between the encryption method and the decryption method is administrated by the encryption/decryption method administration means 3, and therefore even if the position of the identification data in the encrypted data is detected by the cryptanalysis, the decryption algorithm or decryption key is not found, and it is impossible to analyze and solve the decryption method for the encrypted data.

Figure 2:
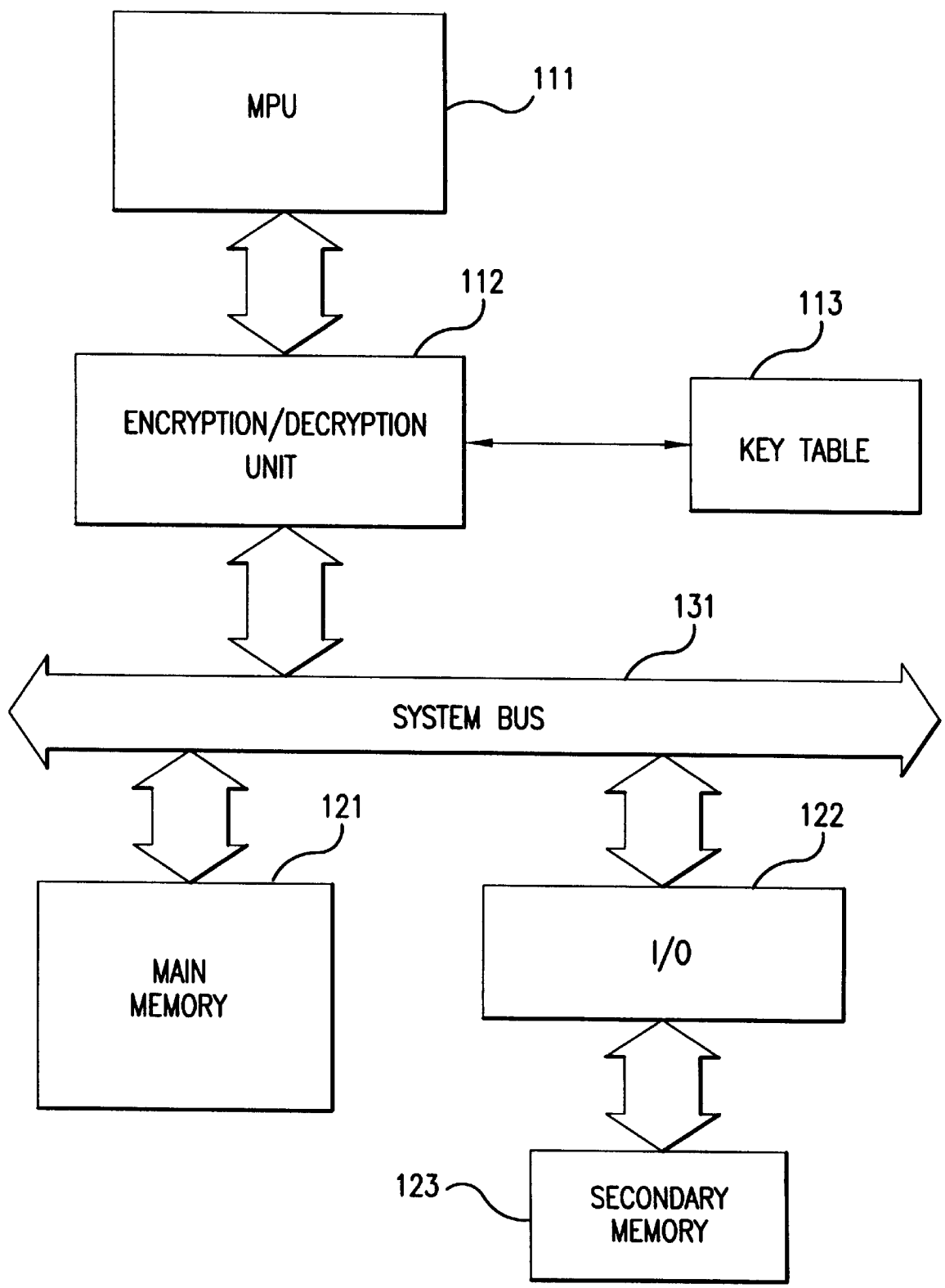
FIG. 2 is a block diagram showing a schematic construction of an embodiment of an information processing apparatus with a software protecting function according to the present invention.

FIG. 2 is a block diagram showing the schematic construction of the information processing apparatus with a software protecting function, which embodies the present invention. The apparatus comprises a micro processing unit (MPU) 111 which processes the data in accordance with the program, an encryption/decryption unit 112 for executing encryption/decryption of the data to be processed by the MPU 111, a key table 113 for storing encryption keys and decryption keys used in the encryption/decryption unit 112, a system bus 131 for transmitting the data to be processed by the MPU 111, a main memory 121 for storing the data encrypted by the encryption/decryption unit 112, an I/O interface 122 and an secondary memory 123 connected through the I/O interface 122.

There are some cases where the MPU 111 contains a cache memory, though it is not shown in the figure. The main memory 121 may be principally a dynamic random access memory (DRAM). The secondary memory 123 may be a hard disk, a floppy disk, a CD-ROM, etc. If the encryption and decryption algorithms have already been specified, the encryption/decryption unit can perform encryption of the data to be encrypted and decryption of the encrypted data upon determination of the encryption key and the decryption key.

The operation of the information processing apparatus with a software protecting function is described based on FIG. 2. The data to be protected is encrypted by the encryption/decryption unit 112 and then stored in the main memory 121 or secondary memory 123. At that time, plural encryption keys are prepared to be used for encryption in the encryption/decryption unit 112, and a key is selected from the key table 113 by referring to several specific bits of the encrypted data. Which bits are referred to and how to refer to the bits are determined for each of information processing apparatuses having the software protecting function. When the encrypted data is to be processed by the MPU 111, the data is read by the encryption/decryption unit 112 at first, and then decrypted so that the MPU 111 can process the data. The decryption key used in decryption is selected from the key table 113 by referring to several specific bits of the encrypted data. The method of selecting the several bits to be referred to is determined to be uniquely related to the method used for selecting the encryption key as described above. When the data processed by the MPU 111 is stored again in the main memory 121 or secondary memory 123, it is encrypted again by the encryption/decryption unit 112. Next, the encryption performed in the encryption/decryption unit 112 is described in detail based on FIGS. 3 and 4, and decryption is described based on FIGS. 5 and 6.

Figure 3:
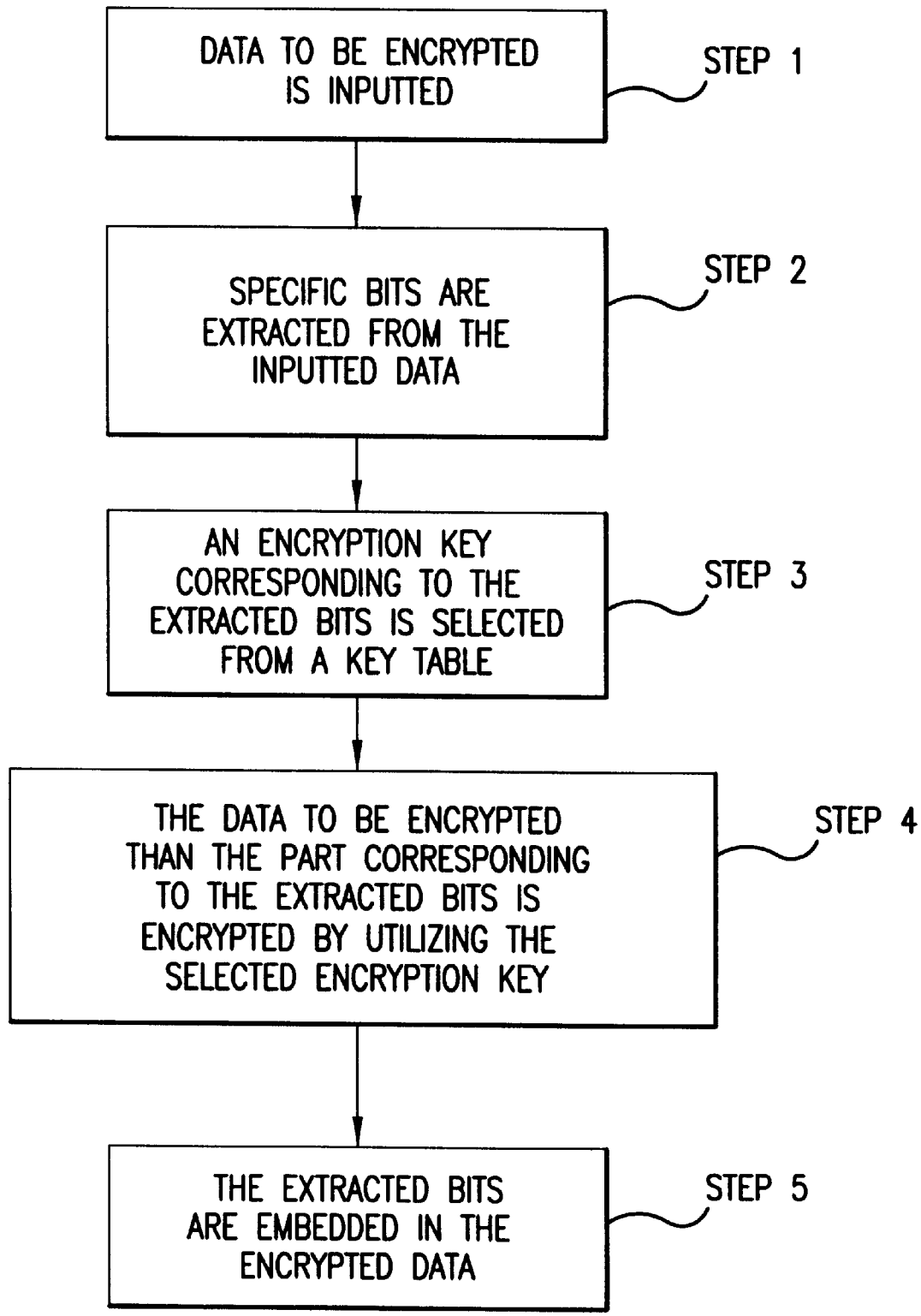
FIG. 3 is a flow chart showing procedures executed by the encryption/decryption unit shown in FIG. 2.

FIG. 3 is a flow chart of the encryption method used in the encryption/decryption unit 112 shown in FIG. 2. The explanation of the flow chart is as follows.

In step 1, data to be encrypted is inputted to the encryption/decryption unit 112.

In step 2, several specific bits are extracted from the data inputted to the encryption/decryption unit 112.

In step 3, an encryption key corresponding to the several bits extracted in step 2 is selected from key table 113.

In step 4, the data to be encrypted other than the part corresponding to the extracted several bits is encrypted by utilizing the encryption key selected in step 3.

In step 5, the several bits extracted in step 2 are embedded in the encrypted data.

The following description shows how the state of data to be encrypted varies in each of the above steps based on the state transition view in FIGS. 4(A) through 4(E). The content stored in the key table 113 is different by each encryption/decryption method. Accordingly, in the description below, in the case where the content of the key table 113 is referred to, a different number is assigned to the key table for each of the encryption/decryption method, whereas in the case of referring to a hardware, the key table 113 itself shown in FIG. 2 is designated.

FIG. 4(A) shows the state of data in step 1. The data to be encrypted are inputted. The data 31 before encryption have 32 bits, and are ready to be directly processed by the MPU 111.

FIG. 4(B) shows the state of data in step 2. Several specific bits are extracted from the data 31 before encryption. In the example, the seventh, eleventh, fifteenth and twenty-third, in total 4 bits of data are extracted. Therefore, the data 31 having 28 bits is left. The extracted bits are arranged in a predetermined configuration as bit information 33. The bit information 33 corresponds to the encryption method identification data 12a shown in FIG. 1.

FIG. 4(C) shows the state of the data in step 3. The encryption key corresponding to the bit information 33 having 4 bits is selected from the key table 40 which has been prepared in advance. The key table 40 corresponds to the key table 13 shown in FIG. 2 so that a key 40b corresponding to the bit information 40a consisting of extracted bits can be uniquely selected. In the example, the key is represented by 4 bits because the number of extracted bits is 4. There are 16 keys 41, 42, 43, . . . corresponding to 16 pieces of bit information 0000, 0001, 0010, . . . , respectively. In this example, since the value of the bit information 33 consisting of extracted bits is 0010, the key 43 is selected as the encryption key.

Figure 4D:
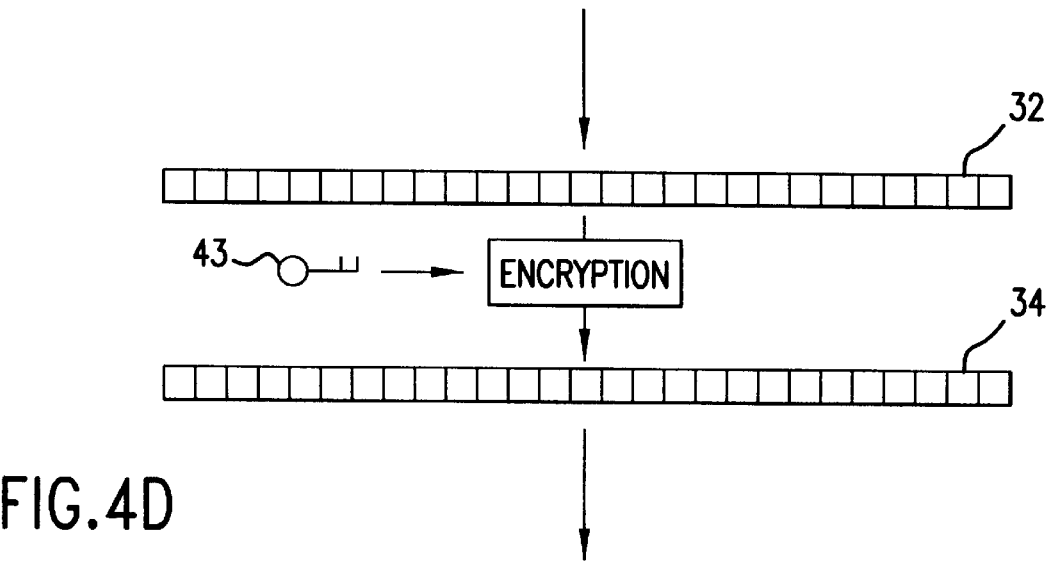

FIG. 4(D) shows the state of the data in step 4. The data 32 having 28 bits other than the part of the bit information consisting of extracted 4 bits is encrypted to generate an encrypted data 34 having 28 bits.

Figure 4E:
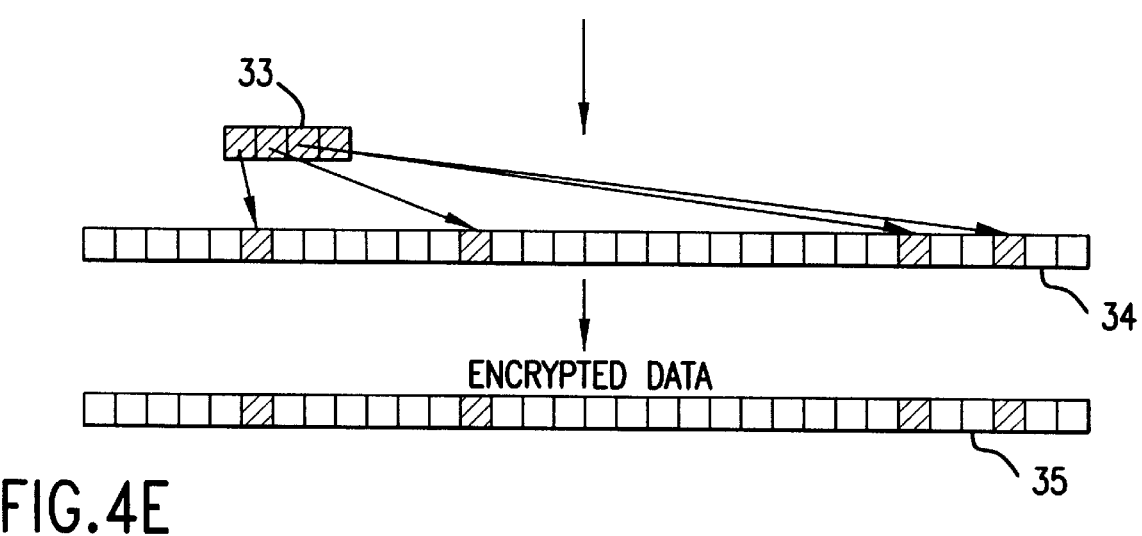

FIG. 4(E) shows the state of the data in step 5. The bit information 33 consisting of 4 bits extracted in step 2 is embedded in the encrypted data 34 having 28 bits, and then the data is stored in the main memory 121 as the encrypted data having 32 bits.

The method of embedding the bit information 33 having 4 bits is determined so as to make a set with the method of separating the bit information 33 in the decryption process. As far as these two methods can be uniquely determined, it is unnecessary to embed 4 bits of the bit information 33 in the bit positions from where they were initially extracted. Moreover, it is also possible to perform scramble or the like at the end so that a third person cannot easily find the positions of the bits used for selecting the encryption key. In the case where the scramble is performed at the end, it is desirable that the method used as the encryption performed in step 4 is other than the scramble. Furthermore, when the bit information 33 consisting of extracted 4 bits is embedded in the encrypted data 34 having 28 bits, it Is possible to embed it after being encrypted by an encryption method such as XOR.

Figure 5:
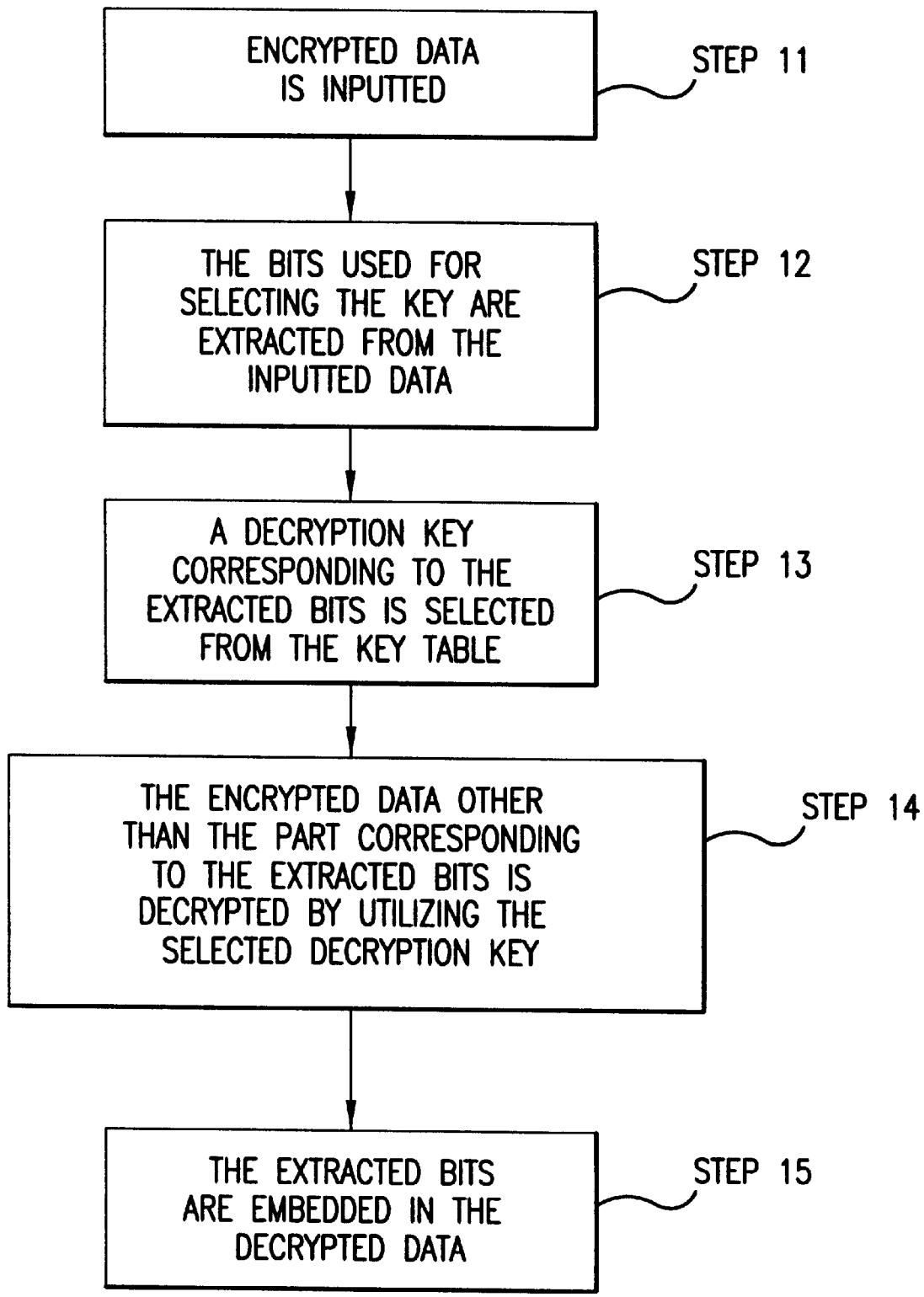
FIG. 5 is a flow chart showing decryption procedures executed by the encryption/decryption unit shown in FIG. 2.

FIG. 5 shows a flow chart of the decryption method used in the encryption/decryption device 112 shown in FIG. 2. The following is the explanation of the flow chart.

In step 11, the encrypted data is inputted to the encryption/decryption unit 112.

In step 12, several bits used for selecting the key extracted from the inputted data in the encryption/decryption unit 112.

In step 13, a decryption key corresponding to the several bits extracted in step 12 is selected from key table 113.

In step 14, the encrypted data other than the part corresponding to the extracted several bits is decrypted by utilizing the decryption key selected in step 13.

In step 15, the several bits extracted in step 12 are embedded in the decrypted data.

According to FIGS. 6(A) through 6(E) showing state transition, how the state of the data to be decrypted varies is now described. Decryption of 32-bit data is taken as an example, on condition that the 32-bit data has been encrypted in accordance with the encryption method shown in FIGS. 3 and 4(A) through 4(E) and then stored in the main memory 121. In this example, it is assumed that a key which is same as the encryption key is used as the decryption key.

Figures 6A, 6B, 6C:
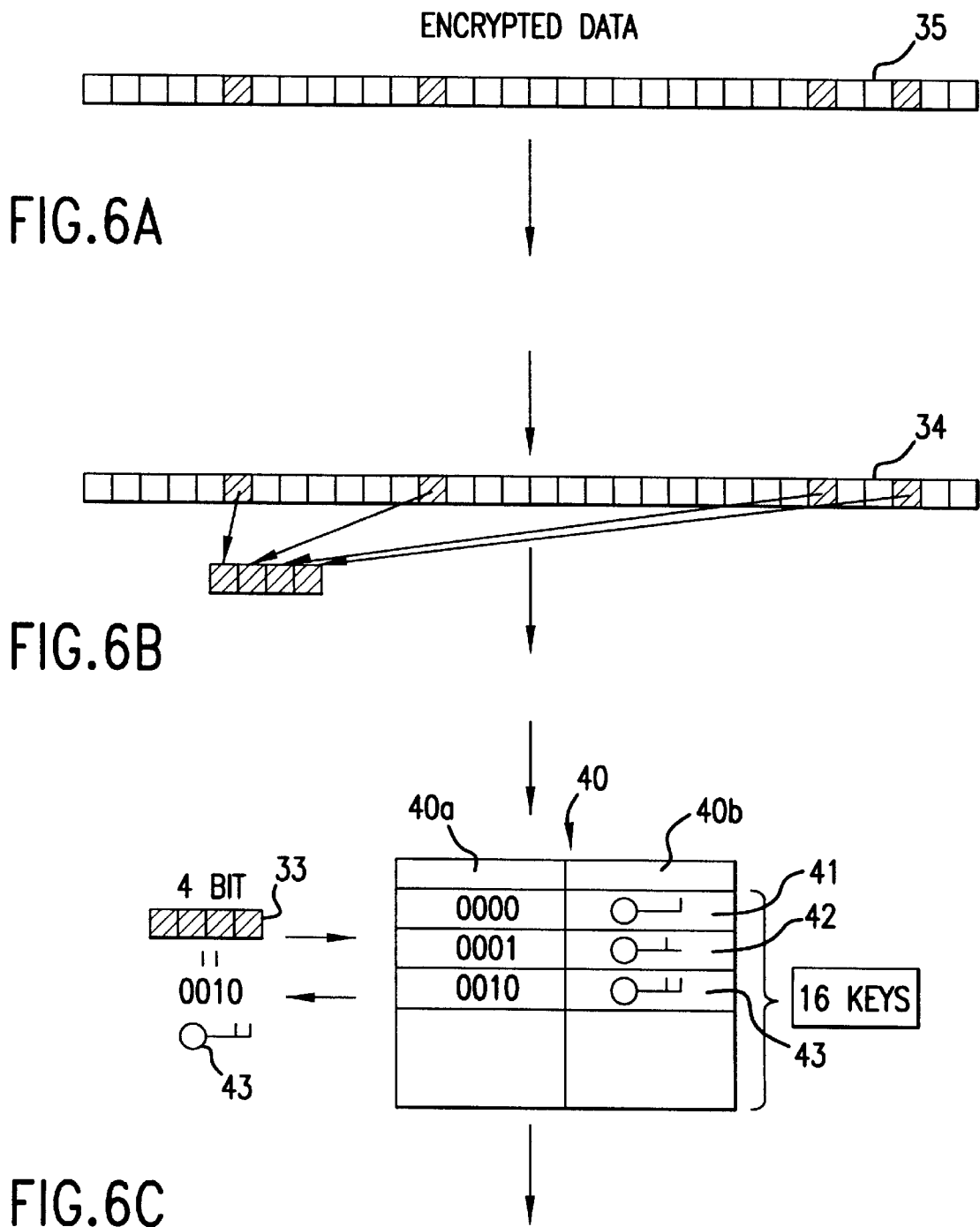
FIGS. 6(A) through 6(E) show the state transition of data in steps 11 through 15 in FIG. 5, respectively.

FIG. 6(A) shows the state of the data in step 11. The encrypted data 35 is read from the storage unit. The encrypted data have 32 bits and is not in a state to be processed by the MPU 111.

FIG. 6(B) shows the state of the data in step 12. Several specific bits are extracted from the encrypted data 35 to obtain bit information 33. In the example, the sixth, thirteenth, twenty-seventh and thirtieth, in total 4 bits are extracted. The positions where 4 bits of the data have been extracted are same as the positions where the bits of the bit information 33 are embedded. As a result, the encrypted data 34 having 28 bits is left.

FIG. 6(C) shows the state of the data in step 13. The key 43 corresponding to the bit information 33 having extracted 4 bits is selected from the key table 40 which has been prepared in advance. Since the value of the bit information 33 is 0010, the key 43 which is the same as the key 43 used in encryption can be selected by utilizing the key table 40, and the selected key 43 functions as the decryption key.

Figure 6D:
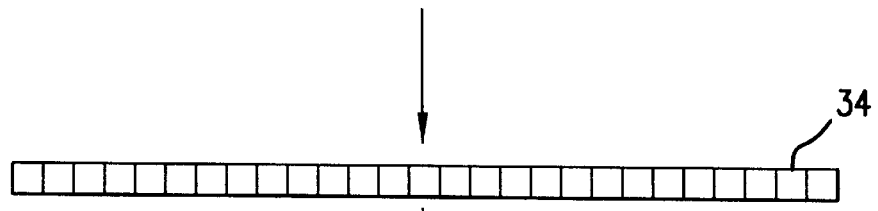

FIG. 6(D) shows the state of the data in step 14. The encrypted data 34 having 28 bits other than the bit information 33 consisting of extracted 4 bits is decrypted by utilizing the selected key 43 as the decryption key, and thereby the data 32 having 28 bits is generated.

Figure 6E:
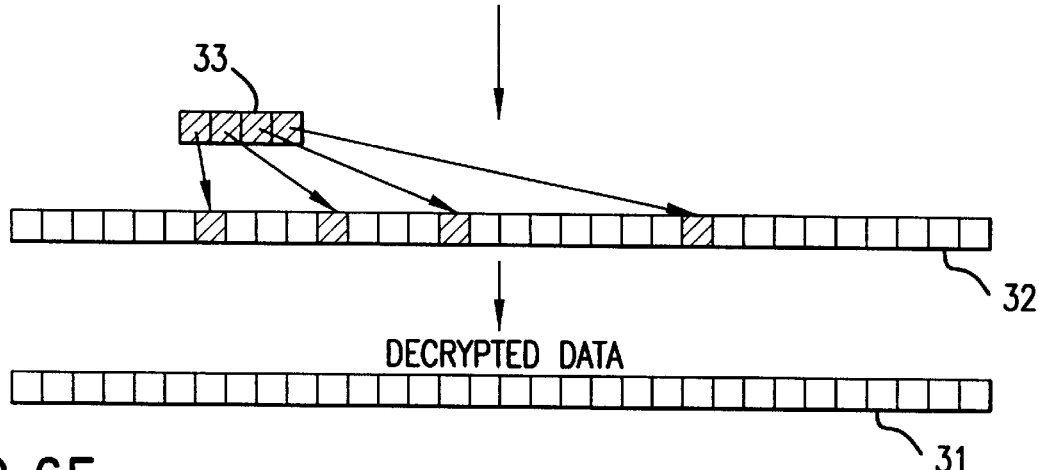

FIG. 6(E) shows the state of the data in step 15. The bit information 33 having 4 bits extracted in the step shown in FIG. 6(B) is embedded in the data 32 having 28 bits, whereby the data 31 having 32 bits is obtained. The positions where the 4 bits of the bit information 33 are embedded are the same as positions where the 4 bits of the data have been extracted when encryption is performed. As a result, the data 31 which is the same as the data before encryption can be obtained.

In the method described above, the data used for selecting the decryption key consists of a part of the encrypted data to be decrypted; and therefore it is unnecessary to add extra information to the data; therefore the memory space can be effectively used. In the above example, the number of bits is concretely shown for the convenience in explanation, but the number of bits can be selected arbitrarily in each information processing apparatus with a software protecting function. Accordingly, efficient encryption/decryption can be performed by selecting a block to be encrypted in relation to a specific unit, for example, a bus width (8 bits, 16 bits, 32 bits, 64 bits, 128 bits and so forth), a page unit adopted in the virtual memory, a data size for exchanging data in a cache memory (i.e., line size), or the like. (The same can be said in the following description.)

In the above example, the encryption key and the decryption key are the same because the same key table is used for selecting the encryption key and the decryption key, but these keys can be made different by separately preparing the key table for encryption and the key table for decryption. Accordingly, an encryption/decryption algorithm such that decryption is performed by utilizing the decryption key which is different from the encryption key used in encryption may be used.

The key table is used for selecting the encryption key based on extracted several bits in the above example, but it is also possible to input the extracted several bits to a specific function and to use the value outputted therefrom as the decryption key, which makes it unnecessary to have the key table. Needless to say, the extracted several specific bits themselves may be the encryption key.

Thus the content of the data stored in the main memory 121 or secondary memory 123 can be kept secret. The selection of the encryption key and the decryption key depends only on the data and the encryption key can be derived from a part of or whole data to be protected, and accordingly, it is possible to encrypt the data by utilizing plural encryption keys independent of the addresses. Therefore, plural encryption keys can be administered independent of the OS even in the case where complex address administration is performed by the OS. That is, the effective defense is available against attacks such as stealing and using the secret data in unauthorized manner by tampering with the OS.

Moreover, since the plural encryption keys are used for encryption, sufficient encryption security level is obtained though the encryption method with a small computation amount (for example, XOR) is used, which results in that the influence exerted on the data processing speed by the encryption and decryption processes is reduced. Consequently, sufficient processing speed and encryption security level are realized even in the case where the program is executed while the data in the memory are decrypted one after another. Thereby it is possible to defend the OS itself such that usually resides in the main memory.

Figure 7:
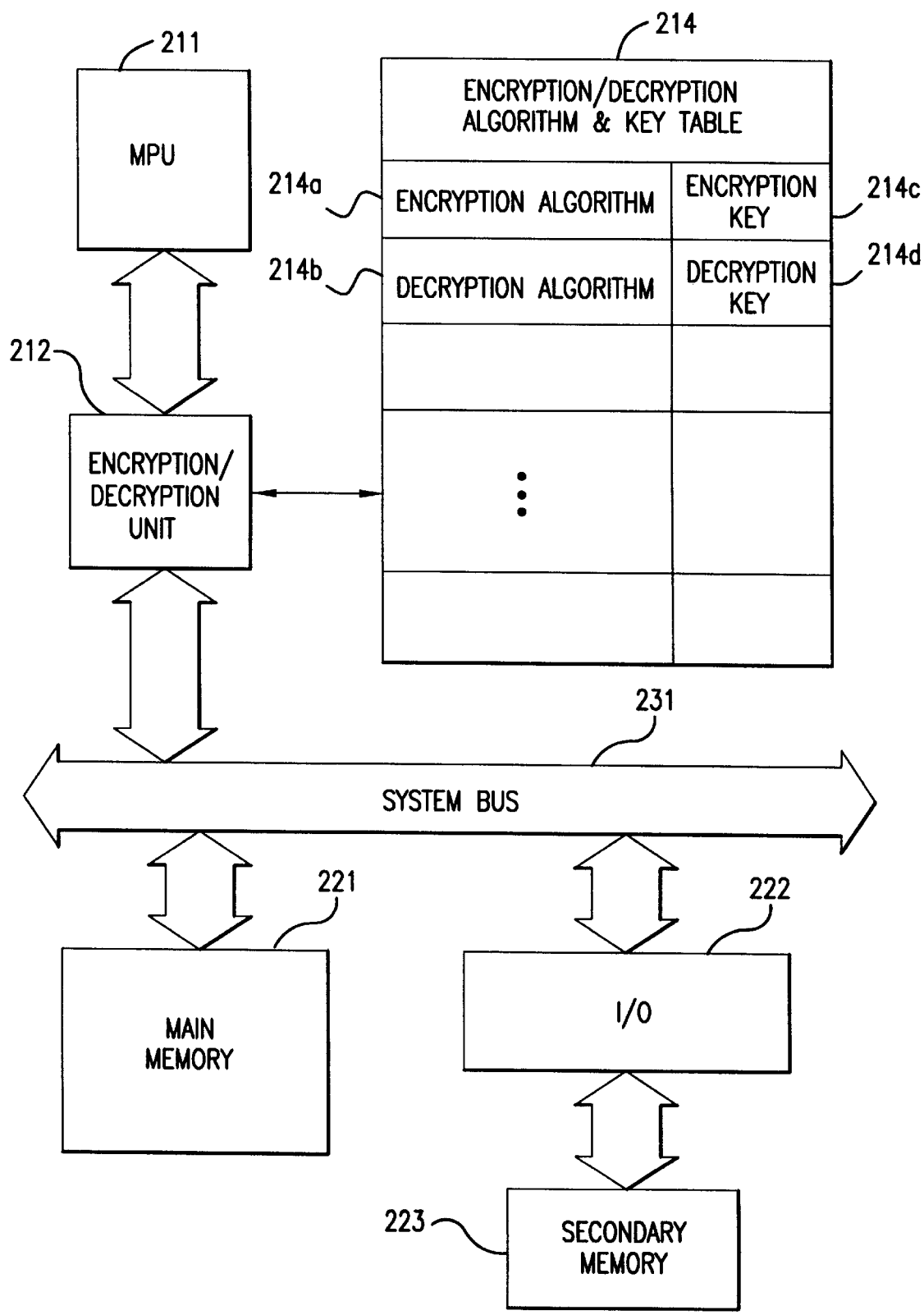
FIG. 7 is a block diagram showing a schematic construction of an information processing apparatus with a software protecting function which uses plural encryption/decryption algorithms.

In the above example, a specific encryption/decryption algorithm is fixed and the different encryption key and decryption key are used for each data. However, the different encryption/decryption algorithm may be used for each data. FIG. 7 is a block diagram showing a schematic construction of an information processing apparatus with a software protecting function which uses plural encryption/decryption algorithms. The information processing apparatus with a software protecting function comprises a micro processing unit (MPU) 211 for processing data in accordance with the program, an encryption/decryption unit 212 for encrypting/decrypting the data to be processed by the MPU 211, an encryption/decryption algorithm and key table 214 for storing an encryption/decryption algorithm, an encryption key and a decryption key, a system bus 231 for transmitting the data to be processed by the MPU 211, a main memory 221 for storing data encrypted by the encryption/decryption unit 212, an I/O interface 222 and a secondary memory connected through the I/O interface 222.

In some cases the MPU 211 contains a cache memory, though it is not shown here. The main memory 221 is principally constituted by DRAM. The secondary memory 223 may be a hard disk, floppy disk, CD-ROM, etc. The encryption/decryption algorithm and key table 214 has plural kinds of encryption algorithms 214a such as XOR and shift, decryption algorithms 214b to the number same as that of the encryption algorithms 214a, and each of which uniquely corresponds to each encryption algorithm, encryption keys 214c to the number same as that of the encryption algorithms 214a, and each of which uniquely corresponds to each encryption algorithm, and decryption keys 214d to the number same as that of the decryption algorithms 214b, and each of which uniquely corresponds to each decryption algorithm. Here, the encryption algorithm and the decryption algorithm corresponding to each other are the algorithms adopting the same method.

The operation of the apparatus is almost the same as that of the information processing apparatus with a software protecting function shown in FIG. 2. However, in this example, the encryption algorithm is selected by utilizing several specific bits extracted from the data before encryption. One encryption key, one decryption algorithm and one decryption key correspond to one encryption algorithm, which are stored in the encryption/decryption algorithm and key table 214. To perform decryption, the decryption algorithm and the decryption key are selected based on the extracted several specific bits, and thereby the data is decrypted.

According to the method as described above, the data can be encrypted by utilizing plural encryption/decryption algorithms, and thereby the encryption security level can be raised further.

In the two examples described so far, the encryption key or encryption algorithm is specified based on the bits extracted from the data to be encrypted, but the relationship between the encryption key and the encryption algorithm is not necessarily required. Therefore, it is possible to select an arbitrary key as the encryption key. The basic hardware construction in the case of selecting the arbitrary key as the encryption key is the same as that of the information processing apparatus with a software protecting function shown in FIG. 2 except for the function of the encryption/decryption unit 112. The processing function of the encryption/decryption unit in the case where the key arbitrarily selected is assumed to be the encryption key is described as follows.

Figure 8:
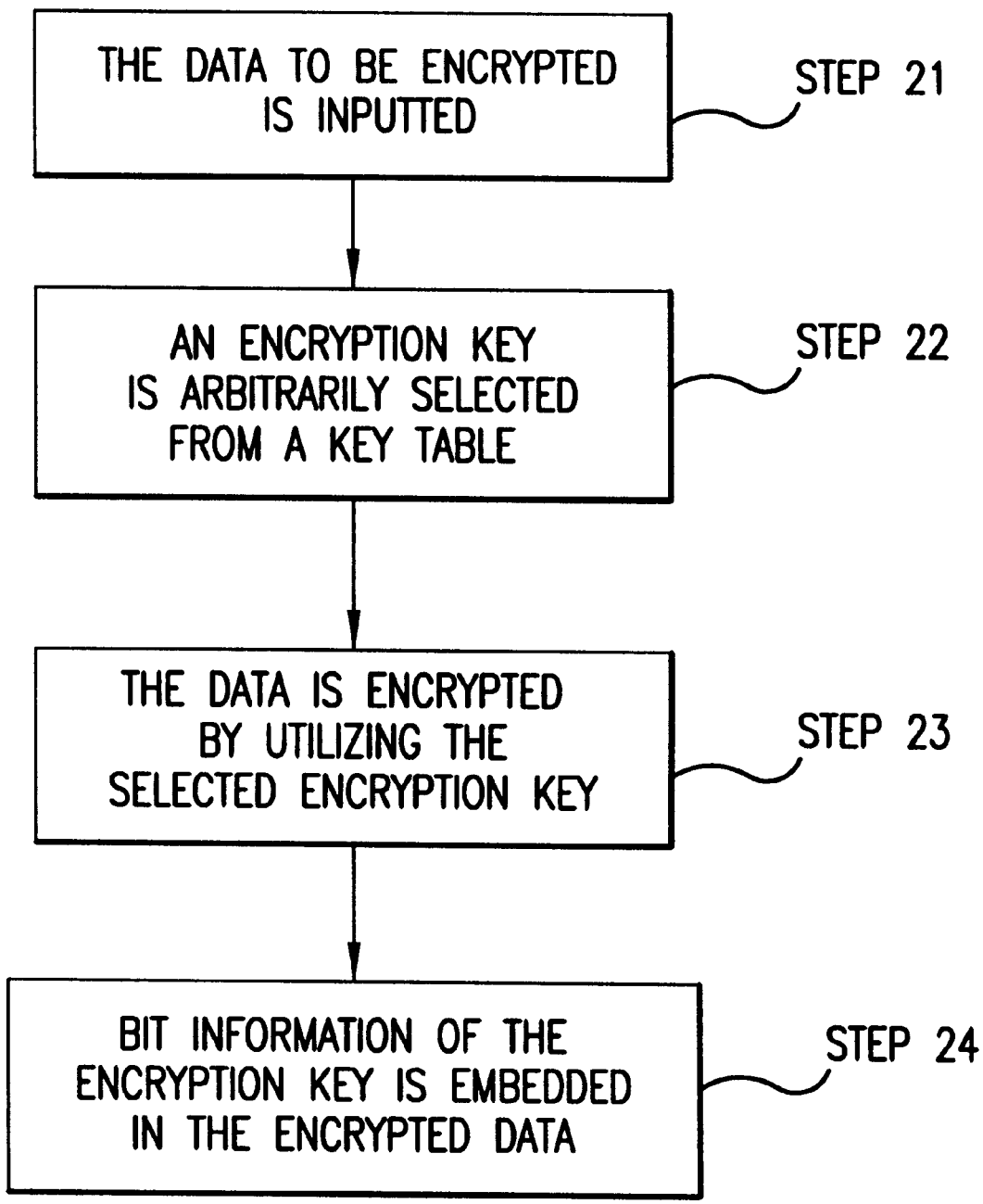
FIG. 8 is a flow chart showing procedures executed in the case where a key arbitrarily selected is assumed to be an encryption key.

FIG. 8 is a flow chart showing the case of arbitrarily selecting the key as the encryption key.

In step 21, the data to be encrypted is inputted to the encryption/decryption unit.

In step 22, the encryption key is arbitrarily selected from the key table.

In step 23, the whole data to be encrypted is encrypted by utilizing the encryption key selected in step 22.

In step 24, the bit information of the encryption key selected in step 22 is embedded in the encrypted data.

Figure 9:
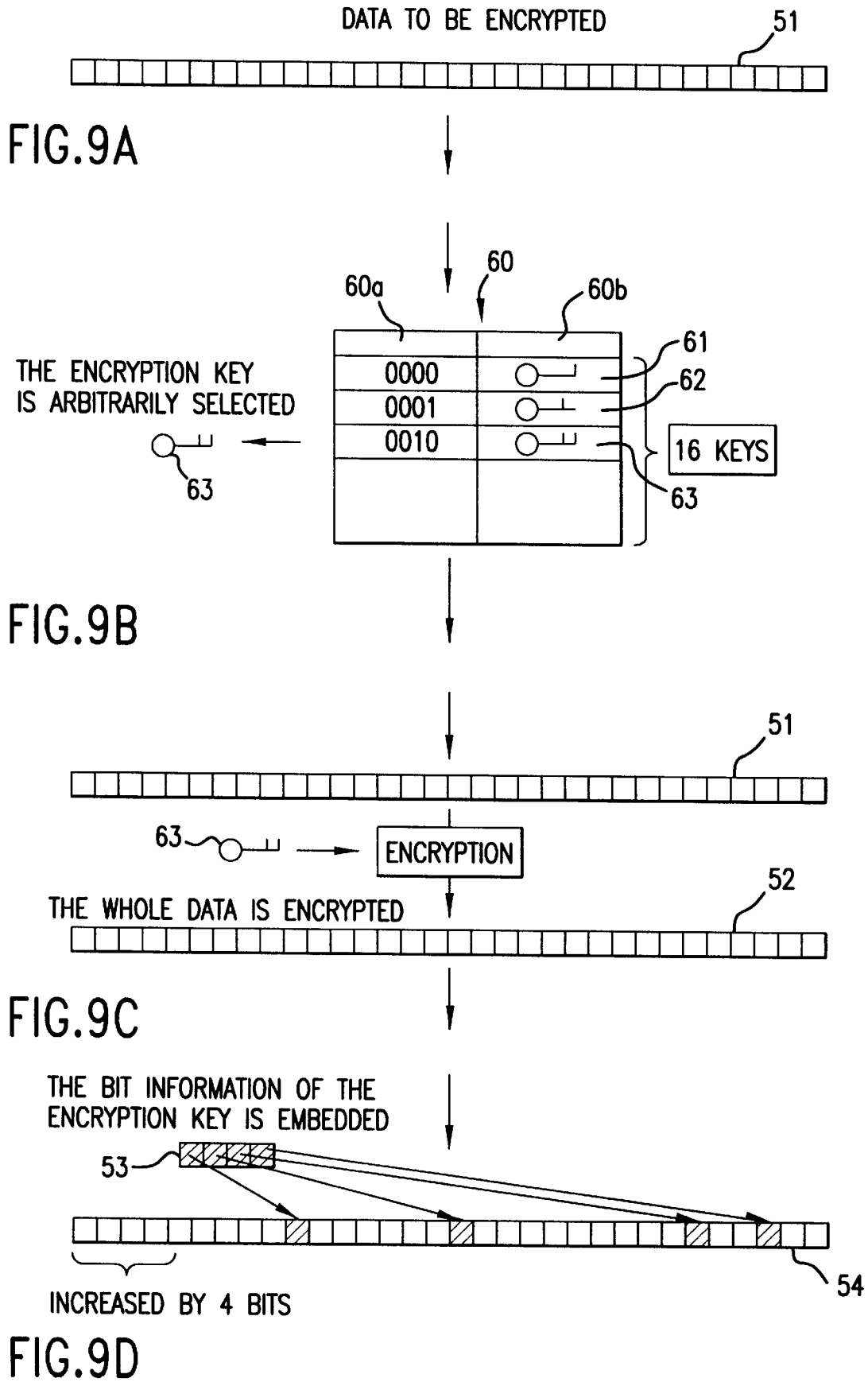
FIGS. 9(A) through 9(D) show the state transition of data in steps 21 through 24 in FIG. 8, respectively.

Next, according to FIGS. 9(A) through 9(D) showing the state transition, how the state of data to be encrypted varies in each step is described. Here the case of encrypting the data having 32 bits is taken as an example. A key table 60 in FIG. 9(B) is the same as the key table 113 in FIG. 2. The length of the key is determined to be, for example, the same as the number of bits of the data to be encrypted, namely, 32 bits here. In this way, the encryption security level can be raised by lengthening the key, namely, increasing the number of bits of the key (the number of bits same as that of the data to be encrypted is desirable, if possible) in comparison with the case where the key is simply extracted from the inputted data.

FIG. 9(A) shows the state of the data in step 21. The data 51 before encryption has 32 bits, and is in a state able to be directly processed by the MPU.

FIG. 9(B) shows the state of the data in step 22. The encryption key is arbitrarily selected from the key table 60 and the bit information corresponding thereto is examined. Each of the pieces of bit information 60a for representation uniquely corresponds to each of the keys 60b in the key table 60. In the figure, 4-bit representation is adopted; therefore the pieces of bit information 0000, 0001, 0010, . . . correspond to the keys 61, 62, 63, . . . , in total 16, respectively. In this example, the key 63 is assumed to be selected as the encryption key. The value of the bit information corresponding to the key 63 is 0010.

FIG. 9(C) shows the state of the data in step 23. The whole data 51 having 32 bits is encrypted by utilizing the selected key 63 as the encryption key, and thereby the encrypted data 52 having 32 bits is generated.

FIG. 9(D) shows the state of the data in step 24. The bit information 53 examined in step 22 is embedded in the encrypted data 52 having 32 bits to generate an encrypted data 54 having 36 bits, then it is stored in the storage device.

The method of embedding the examined bit information 53 may be determined by each information processing apparatus with a software protecting function. To decrypt the encrypted data 54, the above-described steps are executed in reverse order and the data 51 is obtained.

According to the method as described above, selection of the encryption key can be executed independent of the data. In selecting the decryption key, it may be possible to obtain the decryption key by inputting extracted 4 bits to a specific function without using the key table.

Next, an information processing apparatus with a software protecting function in which the encrypted data and the encryption key is connected by utilizing the Hash function, not by embedding the information of the encryption key in the encrypted data.

Figure 10:
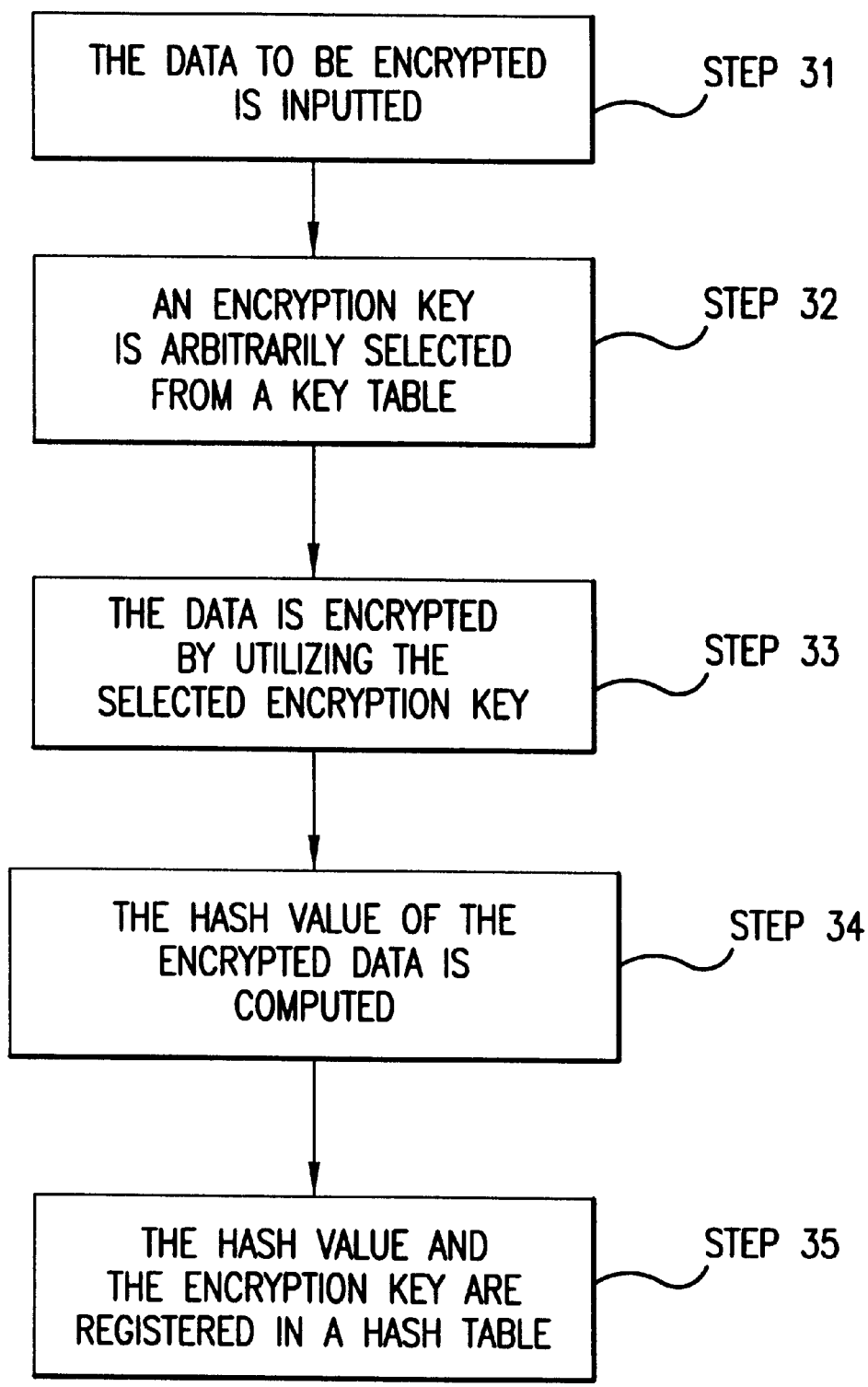
FIG. 10 is a flow chart showing procedures executed in the case where the encrypted data and the encryption key is connected by utilizing a Hash function.

FIG. 10 is a flow chart showing the case where the encrypted data and the encryption key is connected by utilizing the Hash function. Here is shown a variation of the encryption method used in the encryption/decryption unit 112 in the information processing apparatus with a software protecting function. The functions other than the encryption/decryption unit 112 are the same as those of the information processing apparatus with a software protecting function shown in FIG. 2, and accordingly, only the processing function of the encryption/decryption unit 112 is described in this example.

In step 31, the data to be encrypted is inputted to the encryption/decryption unit 112.

In step 32, the encryption key is arbitrarily selected from the key table 113.

In step 33, the whole data to be encrypted is encrypted by utilizing the encryption key selected in step 32.

In step 34, the Hash value of encrypted data is computed.

In step 35, a set of the encryption key and the Hash value computed in step 34 is made, and the set is registered in a Hash table.

According to FIGS. 11(A) through 11(E) showing the state transition, how the state of the data to be encrypted varies is explained. Here, the case of encrypting the data having 32 bits is taken as an example. The key table shown in FIG. 11(B) correspond to the key table 113 shown in FIG. 2.

FIG. 11(A) shows the state of the data in step 31. The data 71 before encryption has 32 bits, and is in a state able to be directly processed by the MPU.

FIG. 11 (B) shows the state of the data in step 32. Each of the pieces of bit information 80a determined for representation uniquely corresponds to each of the keys 80b in the key table 80. In the figure, 4-bit representation is adopted; therefore, the pieces of bit information 0000, 0001, 0010, . . . correspond to the keys, in total 16, 81, 82, 83, . . . , respectively. In this example, the key 83 is assumed to be selected as the encryption key. The value of the bit information corresponding to the key 83 is 0010.

FIG. 11(C) shows the state of the data in step 33. The data 71 having 32 bits is encrypted as a whole by utilizing selected key 83 as the encryption key, and thereby the encrypted data 72 having 32 bits is generated.

Figure 11D:
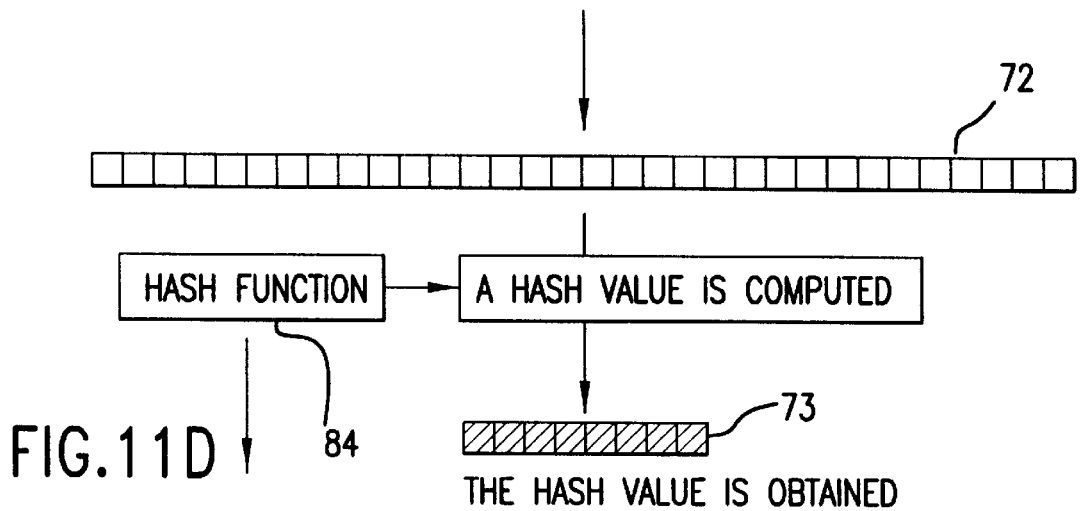
Figure 11E:
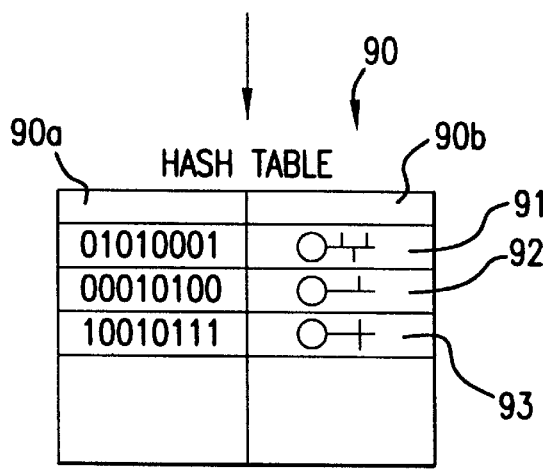

FIG. 11(D) shows the state of the data in step 34. The encrypted data 72 having 32 bits is inputted to the Hash function 84 to obtain the Hash value 73.

FIG. 11 (E) shows the state of the data in step 35. The Hash value 73 and the key 83 used for encryption are made to be a set and registered in the Hash table 90. The Hash table 90 uniquely connects each of the Hash values 90a and each of the keys 90b. In the figure, the keys 91, 92, 93, . . . are registered corresponding to the Hash values 01010001, 00010100, 10010111, . . . , respectively. The encrypted data 72 having 32 bits is stored in the storing unit.

In the case of decrypting the encrypted data, it is necessary to obtain the Hash value of the encrypted data and select a key from the Hash table, and then decryption is performed by utilizing the selected key as the decryption key.

According to the above-described means, plural encryption keys can be administered independent of the OS even in the case where complex address administration is executed by the OS because the decryption key can be extracted from the Hash value of the encrypted data based on the Hash table. Moreover, it is possible to compress the enormous data space of the data to be encrypted (32 bits in this example) to the data space of the Hash value (8 bits in this example) by utilizing the Hash function; therefore the memory space used for administration of the keys can be greatly reduced.

If it happened that different two pieces of data have the same Hash value though they were encrypted by different encryption keys, two encryption keys exist for one Hash value, and there occurs a fear of difficulty in determining which encryption key was used for encryption in practice. In such case, when the Hash value of the encrypted data becomes the same as that has already been registered, a measure such as encrypting the data again by another encryption key is taken, whereby the problem is resolved. In this case, the data before encryption must be retained in a buffer or the like until it is confirmed that the Hash value of the encrypted data is not the same as the other Hash values.

In the above example, the case is assumed where the data encrypted in the information processing apparatus is decrypted and then processed, but only with this function, it is difficult for other apparatuses to develop software to be used in this information processing apparatus. This problem can be cleared by providing a new, different decryption unit for decrypting data provided by other apparatuses. The example is described as follows.

Figure 12:
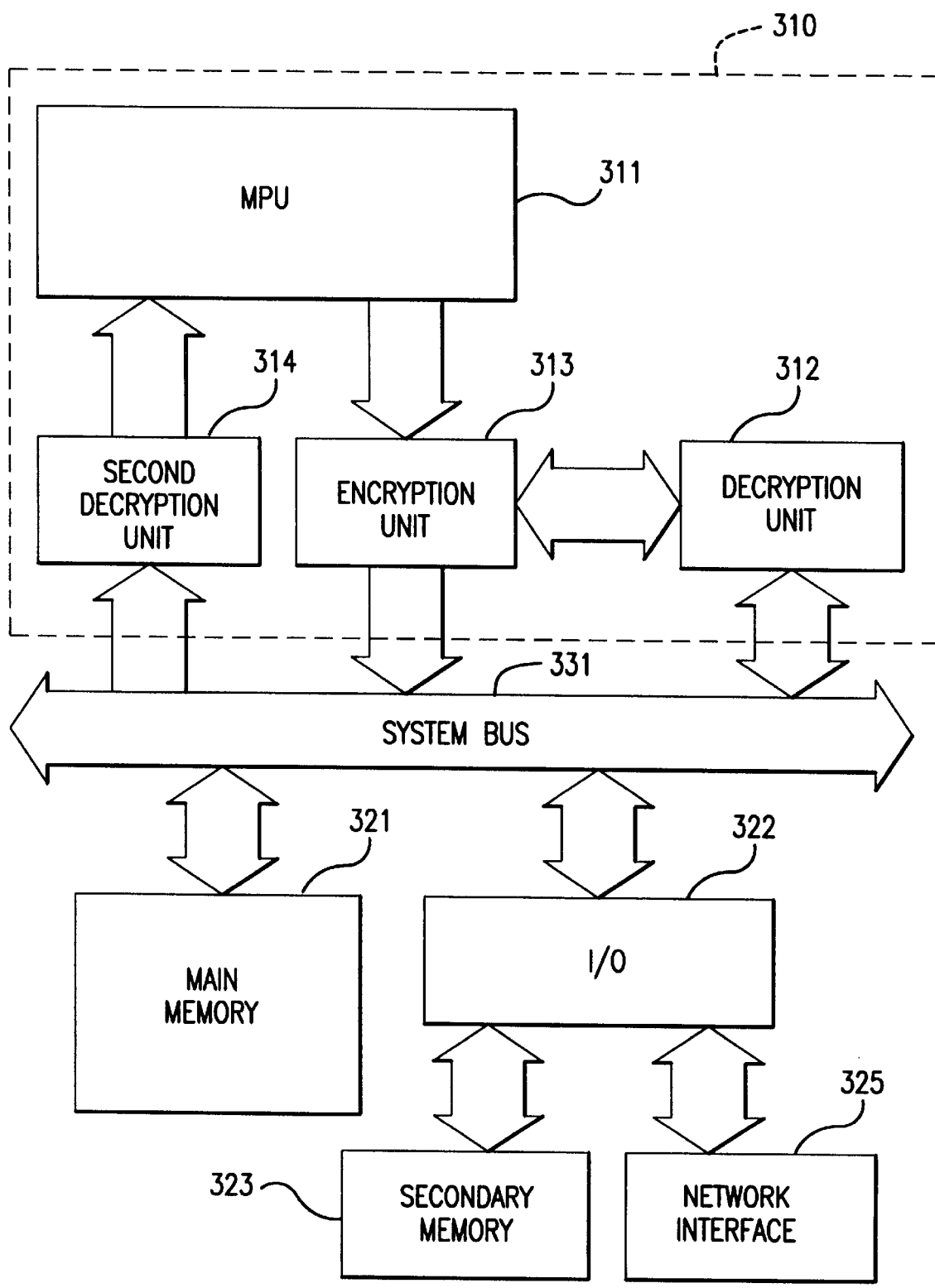
FIG. 12 is a block diagram showing an information processing apparatus with a software protecting function capable of decrypting encrypted data provided by other apparatuses.

FIG. 12 is a block diagram showing an information processing apparatus with a software protecting function capable of decrypting encrypted data provided by other apparatuses. The information processing apparatus having a software protecting function comprises a micro processing unit (MPU) 311 for processing the data, a decryption unit 312 for decrypting the encrypted data, an encryption unit 313 for immediately encrypting the decrypted data, a main memory 321 for storing the data encrypted by the encryption unit 313, a second decryption unit 314 for decrypting the data which has been encrypted by the encryption unit 313 and stored in the main memory 321, a system bus 331, an I/O interface (I/O) 322, a secondary memory 323 and a network interface 325.

The MPU 311, decryption unit 312, encryption unit 313 and second decryption unit 314 are housed In a tamper resistant module 310 which prevents external probes of programs and data or tampering therewith. As the tamper resistant module, for example, "stored information protecting device" disclosed by a Japanese Patent Laid-Open Publication No. Sho. 63-124153 (1988) may be used. The tamper resistant module has the construction such that a surrounding member, on the surface of which a conductive wire with a complex routing is formed, encloses a circuit board handling the secret information. If the surrounding member is destroyed or penetrated with the intention of illegitimately analyzing the secret information inside of the member, a breakage or short-circuiting of the conductive wire occurs, which triggers erasure of the secret information.

With the above construction, the data is provided by a software provider to the user in the state of having been encrypted through the network, CD-ROM, or the like. The encryption method used here is versatile and of high encryption security level. For example, the software provider encrypts the data to be provided to the user by utilizing the DES (Data Encryption Standard) as the encryption method. The encryption key is encrypted by a public key of the information processing apparatus having a software protecting function in accordance with, for example, RSA (Rivest, Shamir, Adleman: the algorithm devised by Ronald Rivest, Adi Shamir and Leonard Adleman), and then paired with the encrypted data to be provided to the user. The user transmits the data encrypted by utilizing the DES to the decryption unit 312 through the I/O 322.

The data decrypted by the decryption unit 312 is directly transmitted to the encryption unit 313, and then encrypted by utilizing a secret encryption algorithm and encryption key which are specific to each information processing apparatus with a software protecting function. Identification information for specifying the encryption algorithm and encryption key is embedded in a predetermined position in the encrypted data, or administrated corresponding to the Hash value of the encrypted data. The data encrypted by the encryption unit 313 is stored in the main memory 321.

The encrypted data stored in the main memory 321 is decrypted by the decryption unit 314, and then forwarded to the MPU 311 for execution. The decryption key and the decryption algorithm used in decryption by the second decryption unit 314 can be obtained by analyzing the identification information embedded in the encrypted data, or obtained based on the Hash value of the encrypted data. Among the data processed and outputted by the MPU 311, those requiring encryption are encrypted by the encryption unit 313 and then stored in the main memory 321.

As described above, since the data encrypted by utilizing the encryption method and the encryption key having been published can be inputted to the information processing apparatus with a software protecting function and decrypted by the decryption unit 312, it is not necessary for the software provider to know the encryption/decryption method nor encryption/decryption key used in the encryption unit 313 and the second decryption unit 314; accordingly it may be sufficient to develop the software only for the MPU 311. That is, a third party who is unable to know the encryption/decryption method and encryption/decryption key in the information processing apparatus with a software protecting function can freely develop the software to be protected by the information processing apparatus having a software protecting function. Because the decrypted data decrypted by the decryption unit 312 is directly encrypted by the encryption unit 313, the user cannot access the decrypted data.

In the encryption method and the decryption method used in the encryption unit 313 and the second decryption unit 314, it becomes possible to use plural encryption keys for encryption by embedding the identification information specifying the algorithm and key in the encrypted data or by utilizing the method which connects the Hash value and the identification information, as described in the above example,. Thereby sufficiently high encryption security level is available even though the encryption algorithm with a small computation amount is used. As a result, the influence given by the encryption/decryption process to the data processing speed can be reduced, and moreover, even in the case where the program is executed while the data in the memory are decrypted one after another, sufficient processing speed and high encryption security level can be realized.

Because it is unnecessary to share the encryption method and the decryption method used in the encryption unit 313 and the decryption unit 314, respectively, with other information processing apparatuses, the encryption and decryption algorithms and the encryption and decryption keys can be set or updated independently in only one information processing apparatus. If the encryption and decryption algorithms and the encryption and decryption keys are set to be updated on a specific condition, for example, when the power supply is on/off or every other day, the encryption security can be further improved. To update the encryption and decryption keys when the power supply is on/off, the value of the key in the key table shown in FIG. 2 should be changed when the power supply is on.

As described above, the MPU 311, the decryption unit 312, encryption unit 313 and the second decryption unit 314 are housed in the tamper resistant module 310; therefore, if the surrounding member of the tamper resistant module 310 is destroyed with the intention of illegitimately analyzing the secret information inside thereof, the secret information is erased. As a result, by housing the MPU processing the encryption key, decryption key and the unencrypted data, encryption unit and decryption unit in the tamper resistant module, the person to commit illegitimacy almost loses a clue to carry out stealing of the secret infrormation, which further improves the secrecy of the programs and data.

The example shown in FIG. 12 is the information processing apparatus which receives the software developed by other apparatuses. In contrast with this, in the case of encrypting the software developed inside of the apparatus and transmitting it to other apparatuses, the apparatus is required to have another encryption unit. This encryption unit performs encryption by adopting the encryption algorithm having high level of encryption security, such as the DES. Thereby the software in the course of development can increase its encryption security by combination of an algorithm with a small computation amount and plural keys, and moreover, the encryption security level of the software can be raised further by utilizing the algorithm having high encryption security level when it is transmitted to other apparatuses.

In the above description of the present invention, terms such as MPU, main memory, and so forth, which are currently used for referring to computer systems are employed, but these terms are not the limitation on the present invention; therefore any constituents having the same functions are acceptable. As the encryption and decryption algorithms with a small computation amount, the XOR, shift, scramble and so forth are taken for examples, but they can be substituted by more complex encryption and decryption algorithms, provided that the processing capability of the computer is going to be improved.

Second Embodiment

Figure 13:
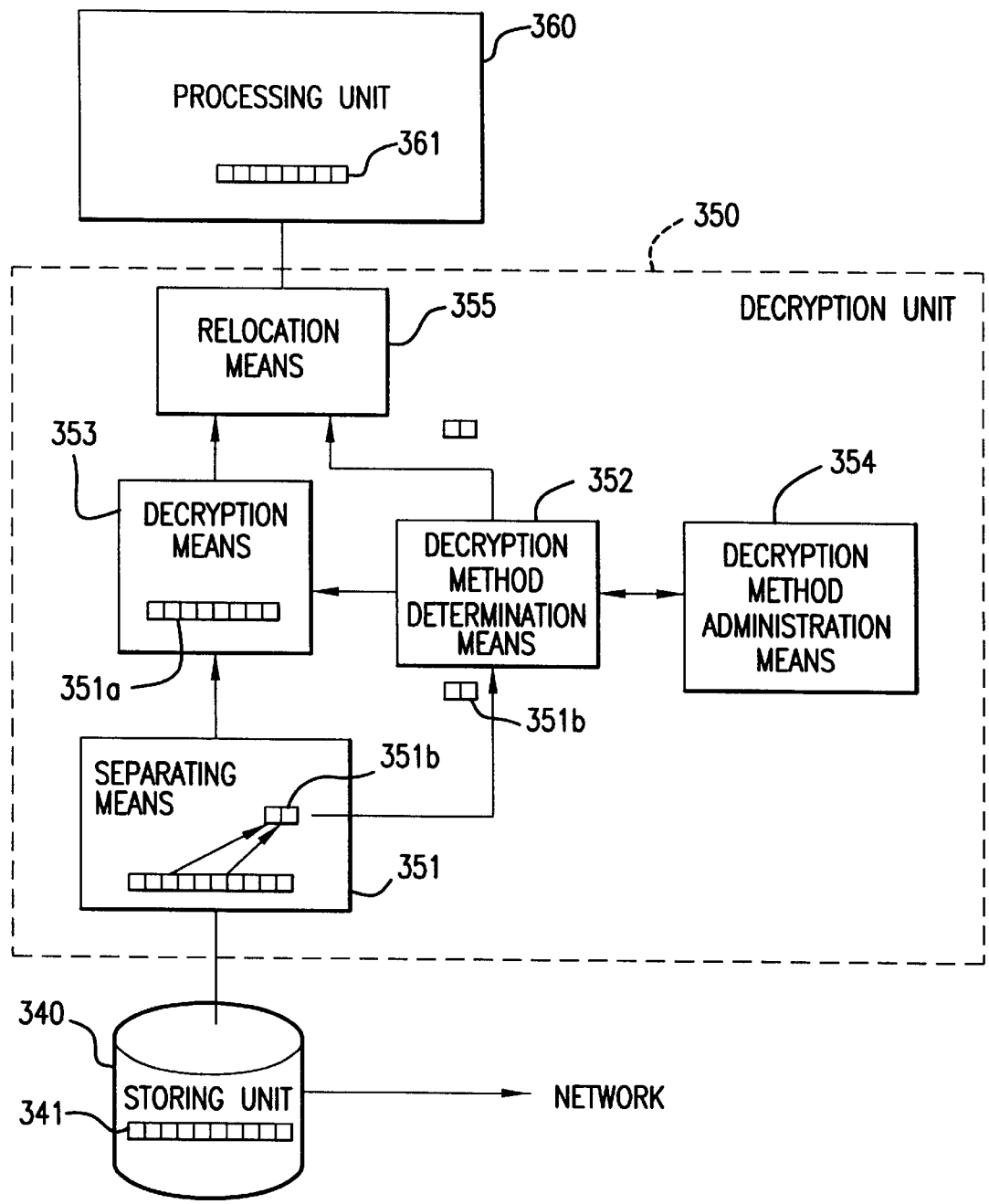
FIG. 13 shows a construction of another embodiment of the information processing apparatus according to the present invention.

FIG. 13 shows another embodiment of the information processing apparatus according to the present invention. In the figure, a storage device 340 receives the encrypted information from the network or the like and stores it. A decryption unit 350 decrypts the encrypted information stored in the storing unit 340 so that the information can be processed by a processing unit 360. The decryption unit 350 contains separating means 351, decryption method determination means 352, decryption means 353, decryption method administration means 354 and location means 355. With this construction, the encrypted data 341 stored in the storage device 340 is decrypted. The processing unit 360 executes processing in accordance with the data decrypted by the decryption unit 350. The operation of the apparatus shown in FIG. 13 is described as follows.

The storing unit 340 receives the encrypted data from the network, CD-ROM, or the like and stores it. The data 341 stored in the storage device 340 is inputted to the separating means 351 in the decryption unit 350, and separated into data to be decrypted 351*a* and recognition data 351*b*. The data to be decrypted 351*a* is inputted to the decryption means 353 and the recognition data 351*b* is inputted to the decryption method determination means 352. The decryption method determination means 352 selects a decryption method corresponding to the recognition data 351*b* from the decryption method administration means 354, and provides a decryption algorithm or decryption key to the decryption means 353. The decryption means 353 decrypts the data to be decrypted 351*a* by utilizing the provided decryption algorithm or decryption key. The data decrypted by the decryption means 353 and the recognition data 351*b* are concatenated by the location means 355 for generating data 361 which is able to be processed by the processing unit 360, thus being processed.

As described above, the construction having only the decryption unit is possible for the embodiment of the information processing apparatus of the present invention. With the construction, the encrypted information is further encrypted by an encryption method corresponding to the decryption method stored in the decryption method administration means 354 in advance, and provided through the network or CD-ROM. As the field where the apparatus having this construction is applied, home-use game instruments or electronic publications, which do not need to change the given information, can be mentioned. The information processing apparatus which encrypts the information processed by the apparatuses such as described above has the construction having the encryption unit only.

As the several bits to be extracted from the data to be encrypted, a parity bit can be used. The example is described as follows. The hardware construction is the same as that of the apparatus shown in FIG. 2; therefore the construction shown in FIG. 2 is used here for explanation.

Figure 14:
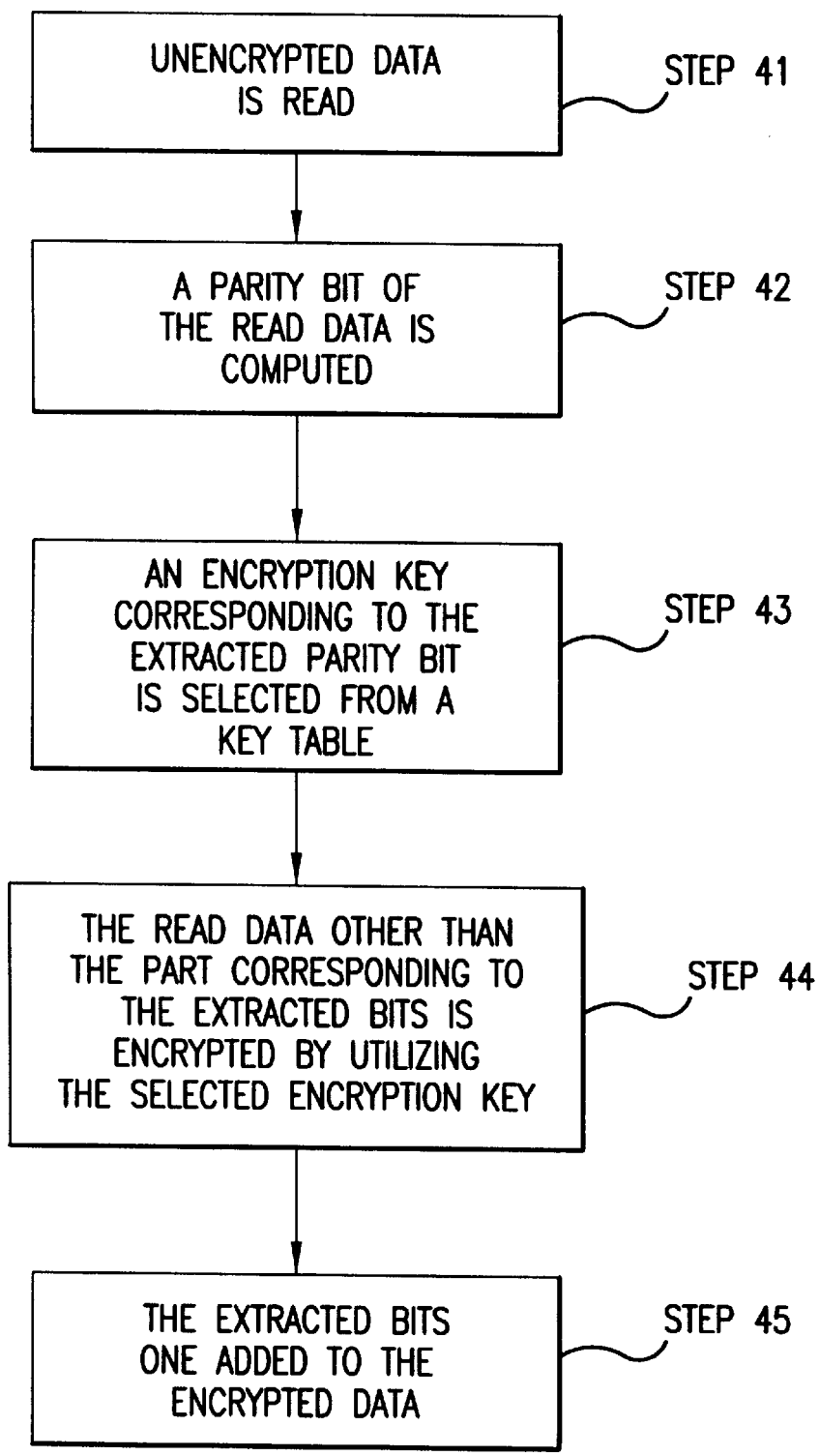
FIG. 14 is a flow chart showing an encryption method specifying a key by a parity bit.

FIG. 14 is a flow chart showing the encryption method which specifies the key by the parity bit. The flow chart is explained below. Here, it is assumed that 4 pieces of unencrypted 32-bit data form a unit of encryption.

In step 41, the encryption/decryption unit 112 reads 4 pieces of unencrypted 32-bit data .

In step 42, a parity bit of every 32-bit data is computed in the encryption/decryption unit 112 to obtain 4 bits used for selection of an encryption key.

In step 43, the encryption key corresponding to the 4 bits computed in step 42 is selected from key table 113 which has been prepared in advance. Each encryption key is represented by 4 bits, and thereby 16 encryption keys in total exist in the key table 113 in this case.

In step 44, inputted data is encrypted by utilizing the encryption key selected in step 43. Here, the encryption method which does not change the value of the parity bit is adopted, such as scramble or permutation.

In step 45, the 4 bits computed as parity bit are added to the encrypted data and stores it in the main memory 121 or secondary memory 123.

According to FIGS. 15(A) through 15(E) showing the state transition, how the data to be encrypted varies is explained. Here, contents of the key table 410 are same as those of the key table 113 shown in FIG. 2.

FIG. 15(A) shows the state of the data in step 41. The data 401 to be encrypted is inputted. The data 401 before encryption is a unit consisting of 4 pieces of data each having 32 bits.

FIG. 15(B) shows the state of the data in step 42. The parity bit of every 32-bit data is obtained from the data 401 before encryption. The obtained parity bits are located in predetermined configurations to generate bit information 402 consisting of 4 bits.

FIG. 15(C) shows the state of the data in step 43. The encryption key corresponding to the bit information 402 consisting of 4 bits is selected from the key table 410 prepared in advance. The key table 410 corresponds to the key table 113 in FIG. 2, and thereby a key 413 can be selected uniquely corresponding to the bit information 402 extracted in step 42. In this example, the number of extracted bits is 4, and therefore the key is also represented by 4 bits, and. Accordingly, keys 411, 412, 413, . . . exist corresponding to 16 bit informations, 0000, 0001, 0010, . . . , respectively. In the figure, the key 413 corresponding to 0010 which is the value of the bit information 402 is selected as the encryption key.

Figure 15D:
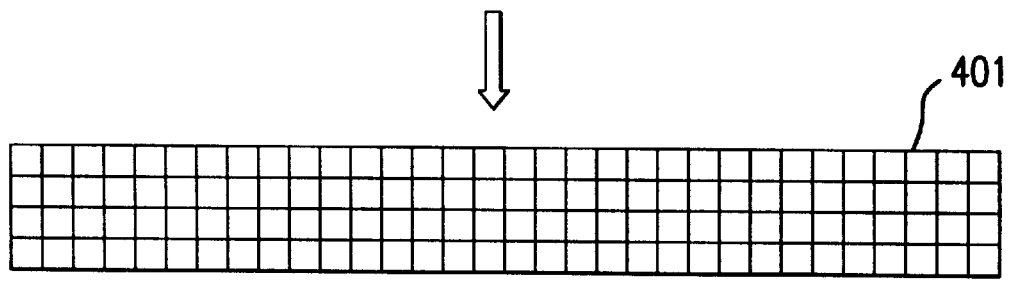

FIG. 15(D) shows the state of the data in step 44. The data 401, which is a unit of 4 pieces of 32-bit data, is encrypted by utilizing the key 413 selected as the encryption key to generate the encrypted data 403. The encryption method used here is the method which does not change the value of the parity bit.

Figure 15E:
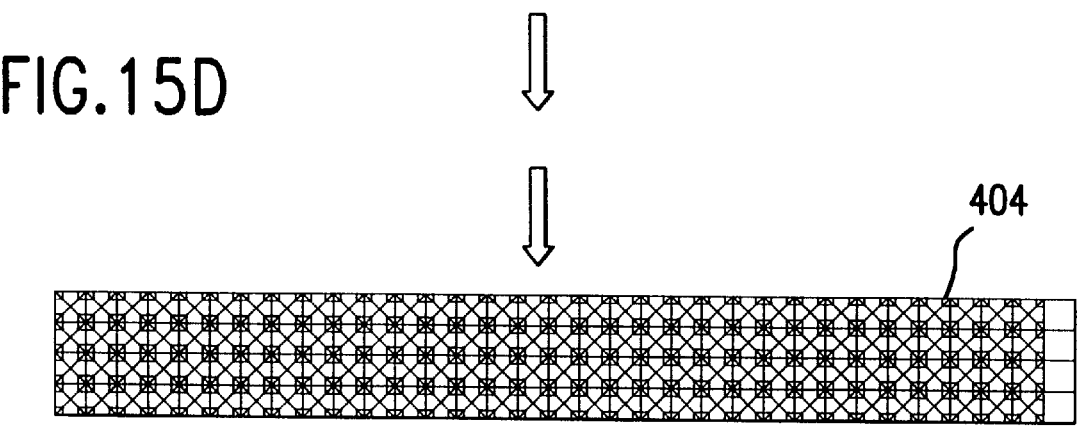

FIG. 15(E) shows the state of the data in step 45. The bit information consisting of 4 bits computed in step 42 is added as the parity bit to the encrypted data 403, then the encrypted data 404 with the parity bit is stored in the main memory 121.

Figure 16:
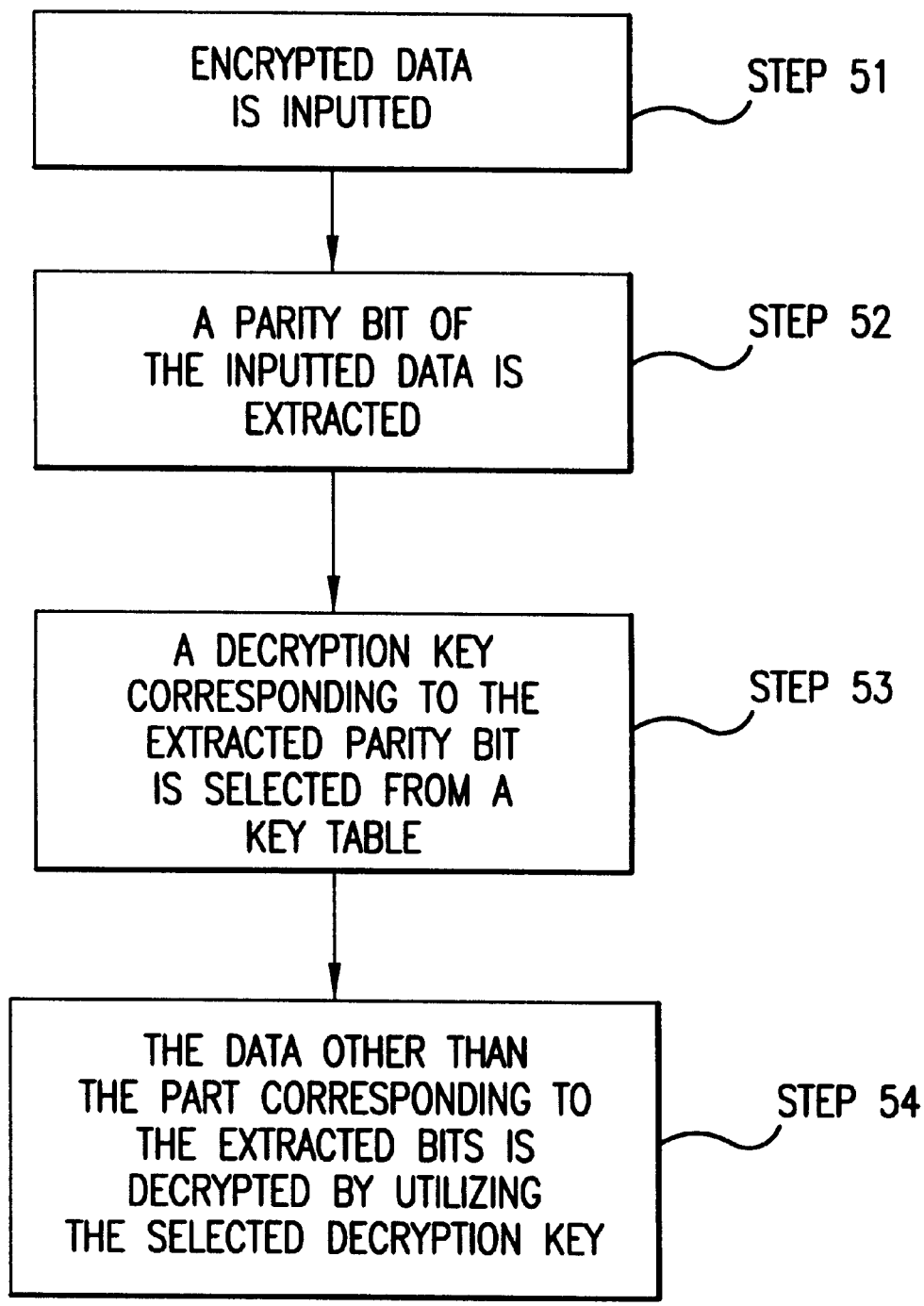
FIG. 16 is a flow chart showing a decryption method specifying a key by a parity bit.

FIG. 16 is a flow chart showing the decryption method which specifies the key by the parity bit.

In step 51, the encrypted data 404 as a set is inputted to the encryption/decryption unit 112.

In step 52, the parity bit is extracted from the inputted data in the encryption/decryption unit 112 to obtain the bit information 402 consisting of 4 bits to be used for selecting the encryption key.

In step 53, the decryption key 413 is selected from key table 410, which corresponds to bit information 402 extracted in step 52.

In step 54, the data 404 to be decrypted other than the part corresponding to the parity bit is decrypted by utilizing the decryption key 413 selected in step 53.

FIGS. 17(A) through 17(E) show state transition in the steps in FIG. 16, In the example, the encryption key and the decryption key are the same key.

FIG. 17(A) shows the state of the data in step 51. The encrypted data 404 is read from the storing unit. The encrypted data consists of 4 pieces of 32-bit data and a parity bit, and is in a state unable to be directly processed by the MPU 111.

FIG. 17(B) shows the state of the data in step 52. The parity bit is extracted from the encrypted data 404 to obtain the bit information 402. As a result, the encrypted data 403 is left.

FIG. 17(C) shows the state of the data in step 53. The key 413 corresponding to the extracted bit information 402 consisting of 4 bits is selected from the key table 410 prepared in advance. Since the value of the bit information 402 is 0010, the key 413 which is the same as the key used in encryption can be selected by utilizing the key table 410.

Figure 17D:
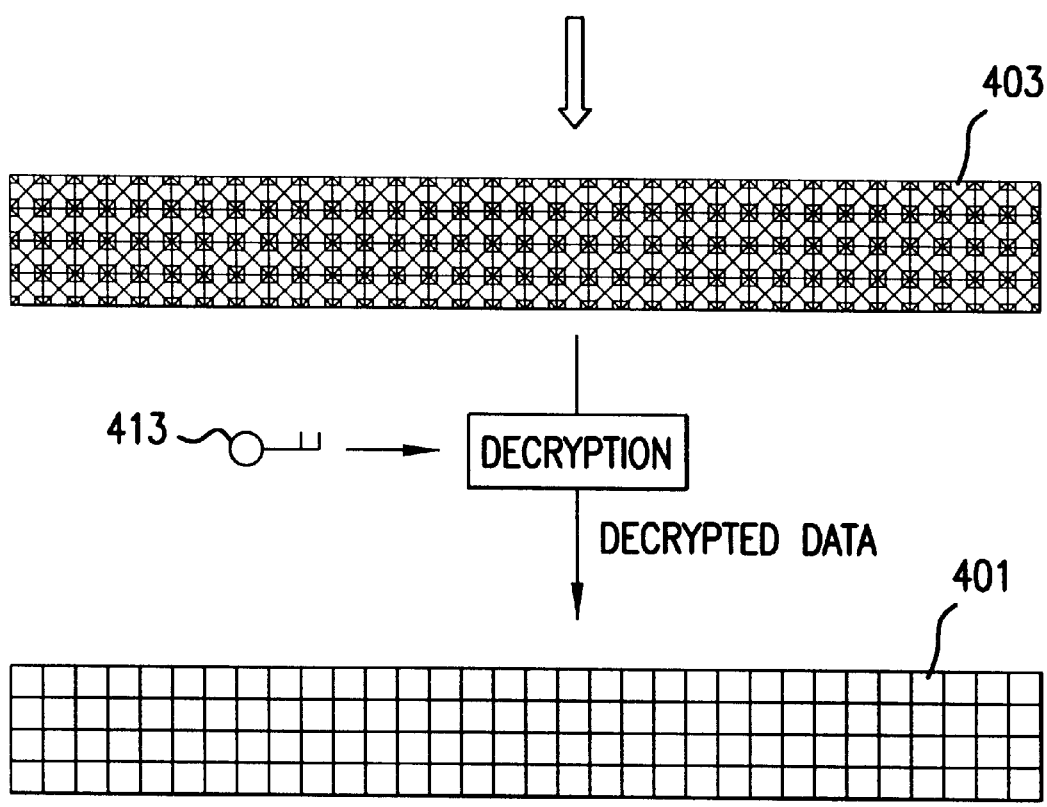
Figure 18:
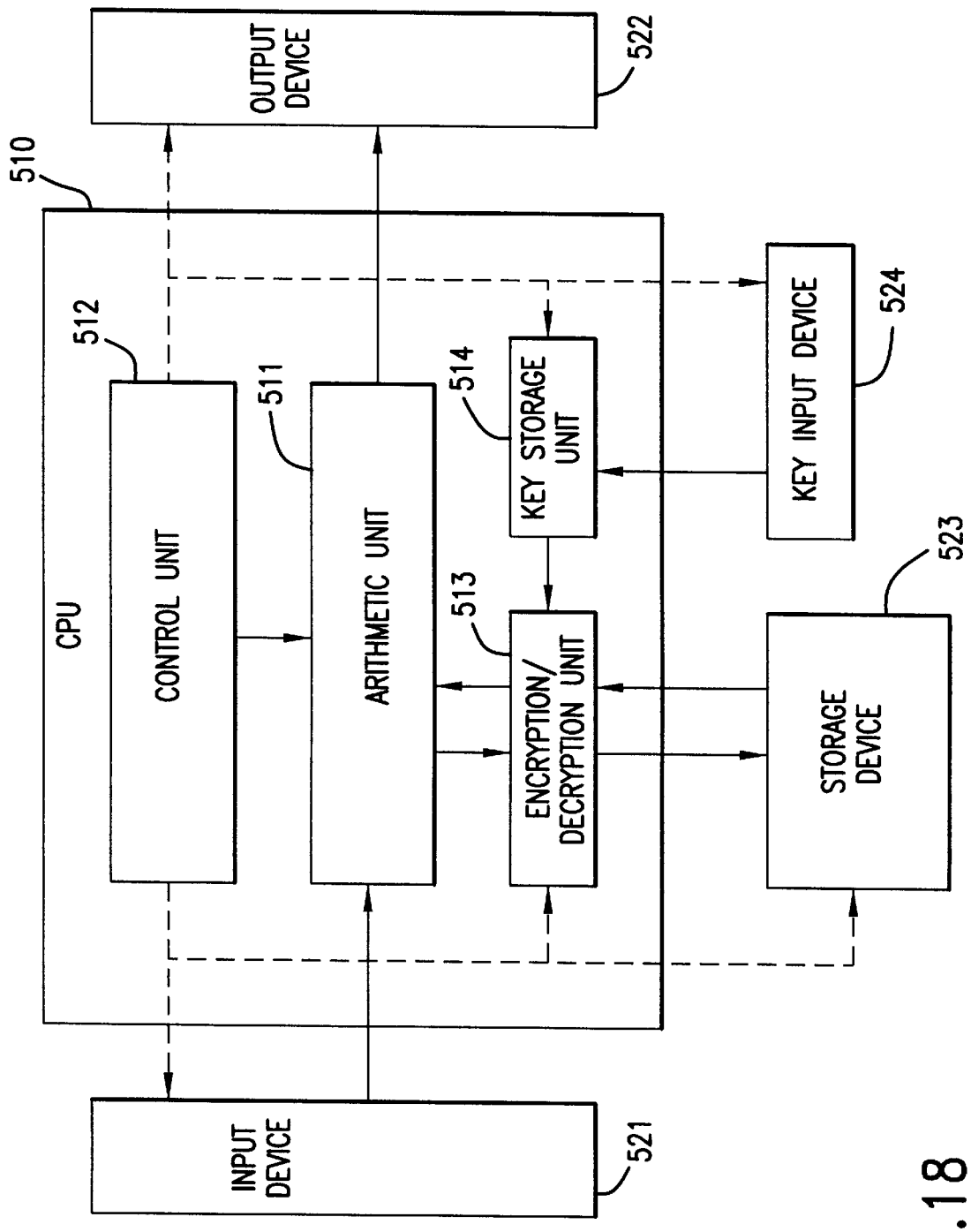
FIG. 18 is a block diagram showing a construction of a conventional information processing apparatus designed for protecting software.

FIG. 17(D) shows the state of the data in step 54. The encrypted data 403 other than the extracted bit information 402 consisting of 4 bits is decrypted by utilizing the key 413 selected as the decryption key, whereby the data 401 which is a unit of 4 pieces of 32-bit data is generated.

In the above example, the concrete number of bits is shown for the convenience in explanation, but the number of bits can be selected arbitrarily as same as the case of encryption/decryption method shown in FIGS. 3, 4(A) through 4(E), 5 and 6(A) through 6(E). That is, efficient encryption/decryption can be performed by selecting a data block to be encrypted in relation to a specific unit, for example, system bus width (8 bits, 16 bits, 32 bits, 64 bits, 128 bits and so forth), a page unit adopted in the virtual memory, a data size for exchanging data in a cache memory (i.e., line size), or the like.

In the case of selecting the key by utilizing the parity bit, the effect is also available as same as the case of using the encryption/decryption method shown in FIGS. 3, 4(A) through 4(E), 5 and 6(A) through 6(E), and accordingly, it is possible to obtain sufficiently high encryption security level by utilizing the encryption/decryption method with a small computation amount independent of the OS. Moreover, in the case of using the parity bit, the parity check system, which is used in general computer system as a standard system for extracting the bit used for selecting the encryption key and the decryption key, is adopted. Therefore, it is unnecessary to newly add a system of such function to the apparatus, and thereby the construction of the apparatus can be made simple.

Moreover, in the case of selecting the key by the parity bit, it is possible to select a combination of the key and the encryption/decryption by replacing the key table 113 with the encryption/decryption algorithm and key table 214. Thereby the programs or data can be encrypted by utilizing plural keys and encryption/decryption algorithms, and therefore the encryption security level can be raised to be sufficiently high even though the encryption method with a small computation amount is used.

The foregoing description of preferred embodiments of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information processing apparatus comprising:
    separating means for separating inputted data into identification data and data to be encrypted;
    determination means for determining an encryption method specified by a combination of an encryption key and an encryption algorithm in accordance with said identification data separated by said separating means;
    encryption means for encrypting said data to be encrypted by utilizing said encryption method determined by said determination means, and generating encrypted data having the number of bits same as that of said data to be encrypted; and
    locating means for locating said identification data showing said encryption method used for encrypting said data to be encrypted in a predetermined position in said encrypted data.

2. The information processing apparatus according to claim 1, further comprising:
    tamper-resistant means for erasing data which manages a processing function of said encryption means if a member surrounding said encryption means is damaged by an external physical action.

3. The information processing apparatus according to claim 1, further comprising:
    changing means for changing said encryption method determined by said determination means.

4. An information processing apparatus having an encryption unit for encrypting inputted data, comprising:
    selection means for selecting an encryption method specified by a combination of an encryption key and an encryption algorithm;
    encryption means for encrypting said inputted data by utilizing said encryption method selected by said selection means and generating encrypted data;
    computing means for inputting said encrypted data encrypted by said encryption means to a hash function and computing a value of said hash function;
    decryption method storing means for storing a decryption method for decrypting said encrypted data, which is specified by a combination of a decryption key and a decryption algorithm corresponding to a value of said hash function obtained by said computing means; and
    hash table for registering a set of values of said hash function corresponding to decryption keys.

5. The information processing apparatus according to claim 4, further comprising:
    tamper-resistant means for erasing data which manages a processing function of said encryption means if a member surrounding said encryption means is damaged by an external physical action.

6. The information processing apparatus according to claim 4, further comprising:
    changing means for changing said encryption method determined by said determination means.

7. The information processing apparatus according to claim 4, further comprising:
    decryption means with a known method for decrypting an encrypted data already specifying a decryption key and a decryption method when it is inputted, wherein said encryption means also encrypts said data decrypted by said decryption means with said known method as data to be encrypted.

8. An information processing apparatus comprising:
    determination means for determining an encryption method specified by a combination of an encryption key and an encryption algorithm;
    encryption means for encrypting data to be encrypted by utilizing said encryption method determined by said determination means and generating encrypted data; and
    location means for locating identification data showing said encryption method used for encryption of said encrypted data in intermixed positions in said encrypted data.

9. The information processing apparatus according to claim 8, further comprising:

tamper-resistant means for erasing data which manages a processing function of said encryption means if a member surrounding said encryption means is damaged by an external physical action.

10. The information processing apparatus according to claim 8, further comprising:

changing means for changing said encryption method determined by said determination means.

11. The information processing apparatus according to claim 8, further comprising:

decryption means with a known method that decrypts an encrypted data specifying a decryption key and a decryption method when it is inputted, wherein said encryption means also encrypts said data decrypted by said decryption means with said known method as data to be encrypted.

12. An information processing apparatus comprising:

separating means for separating inputted data wherein identification data is located in intermixed positions of data to be decrypted into said identification data and said data to be decrypted;

determination means for determining a decryption method specified by a combination of a decryption key and a decryption algorithm in accordance with said identification data separated by said separating means;

decryption means for decrypting said data to be decrypted to the number of bits same as that of said data to be decrypted by utilizing said decryption method determined by said determination means; and location means for locating said identification data in a predetermined position in said data decrypted by said decryption method.

13. The information processing apparatus according to claim 12, further comprising:

tamper-resistant means for erasing data which manages a processing function of said encryption means if a member surrounding said encryption means is damaged by an external physical action.

14. The information processing apparatus according to claim 12, further comprising:

changing means for changing said encryption method determined by said determination means.

15. The information processing apparatus according to claim 12, further comprising:

encryption means for encrypting data decrypted by said decryption means by adopting an encryption method different from an encryption method used for encrypting said inputted data.

16. An information processing apparatus having a decryption unit for decrypting encrypted data which has been inputted, comprising:

computing means for inputting said encrypted data into a hash function and computing a value of said hash function;

hash table for registering a set of values of said hash function corresponding to decryption keys;

decryption method storing means for storing a decryption algorithm for decrypting said encrypted data in correspondence with said value of said hash function;

decryption method selection means for selecting a decryption method corresponding to said value of said hash function computed by said computing means from said decryption method storing means; and decryption means for decrypting said encrypted data by utilizing said decryption method selected by said decryption method selection means.

17. The information processing apparatus according to claim 16, further comprising:

tamper-resistant means for erasing data which manages a processing function of said encryption means if a member surrounding said encryption means is damaged by an external physical action.

18. The information processing apparatus according to claim 16, further comprising:

changing means for changing said encryption method determined by said determination means.

19. The information processing apparatus according to claim 16, further comprising:

encryption means for encrypting data decrypted by said decryption means by adopting an encryption method different from an encryption method used for encrypting said inputted data.

20. An information processing apparatus having an encryption unit and a decryption unit executing encryption of data and decryption of encrypted data, respectively, comprising:

separating means for separating inputted data into identification data and data to be encrypted;

encryption method determination means for determining an encryption method specified by a combination of an encryption key and an encryption algorithm in accordance with said identification data separated by said separating means;

encryption means for encrypting said data to be encrypted by utilizing said encryption method determined by said encryption method determination means and generating encrypted data having the number of bits same as that of said data to be encrypted;

location means for locating said identification data showing said encryption method used for encryption of said encrypted data in a predetermined position in said encrypted data;

storing means for storing said encrypted data in which said identification data is located by said location means;

separating means for separating said encryption data, in which said identification data is located by said location means, stored in said storing means into identification data and said encrypted data;

decryption method determination means for determining a decryption method specified by a combination of a decryption key and a decryption algorithm corresponding to said encryption method in accordance with said identification data separated by said separating means;

decryption means for decrypting said encrypted data to the number of bits same as that of said encrypted data by utilizing said decryption method determined by said decryption method determination means;

second location means for locating said identification data showing said decryption means determined by said decryption means determination means in a predetermined position in said data decrypted by said decryption means; and information processing means for processing said data decrypted by said decryption means.

21. The information processing apparatus according to claim 20 further comprising:

second decryption means with a known method decrypting an encrypted data already specifying a decryption key and a decryption method when it is inputted, wherein said encryption means also encrypts said data decrypted by said decryption means with said known method as data to be encrypted.

22. The information processing apparatus according to claim 20, further comprising:

second encryption means for encrypting data decrypted by said decryption means by adopting an encryption method different from said encryption method used for encrypting said inputted data.

23. An information processing apparatus having an encryption unit and a decryption unit performing encryption of data and decryption of encrypted data respectively, comprising:

encryption method selection means for selecting an encryption method specified by a combination of an encryption key and an encryption algorithm;

encryption means for encrypting data to be encrypted by utilizing said encryption method selected by said selection means to generate encrypted data;

first computation means for inputting said encrypted data encrypted by said encryption means into a hash function and computing a hash function value;

hash table for registering a set of values of said hash function corresponding to decryption keys;

decryption method storing means for storing a decryption method specified by a combination of the decryption key and a decryption algorithm in correspondence with said hash function value computed by said first computation means;

storing means for storing said encrypted data encrypted by said encryption means;

second computation means for inputting said encrypted data stored in said storing means into a hash function and computing a hash function value;

decryption method selection means for selecting a decryption method corresponding to said hash function value computed by said second computation means from said decryption method storing means;

decryption means for decrypting said encrypted data by utilizing said decryption method selected by said decryption method selection means; and information processing means for processing said data decrypted by said decryption means.

24. The information processing apparatus according to claim 23, further comprising:

second decryption means with a known method decrypting an encrypted data already specifying a decryption key and a decryption method when it is inputted, wherein said encryption means also encrypts said data decrypted by said decryption means with said known method as data to be encrypted.

25. The information processing apparatus according to claim 23, further comprising:

second encryption means for encrypting data decrypted by said decryption means by adopting an encryption method different from said encryption method used for encrypting said inputted data.

26. An information processing apparatus comprising:

determination means for determining an encryption method specified by a combination of an encryption key and an encryption algorithm in accordance with a value of a parity bit of inputted data to be encrypted; and encryption means for encrypting said data to be encrypted by utilizing said encryption method determined by said determination means.

27. An information processing apparatus comprising:

determination means for determining a decryption method specified by a combination of a decryption key and a decryption algorithm in accordance with a value of parity bit of data to be decrypted; and decryption means for decrypting said data to be decrypted by utilizing said decryption method determined by said determination means.

28. An information processing apparatus comprising:

encryption method determination means for determining an encryption method specified by a combination of an encryption key and an encryption algorithm in accordance with a value of parity bit of inputted data to be encrypted;

encryption means for encrypting said data to be encrypted by utilizing said encryption method determined by said encryption method determination means;

decryption method determination means for determining a decryption method specified by a combination of a decryption key and a decryption algorithm in accordance with a value of parity bit of data to be decrypted; and decryption means for decrypting said data to be decrypted by utilizing said decryption method determined by said decryption method determination means.

\* \* \* \* \*